US012755606B2

(12) United States Patent
Wolfe et al.

(10) Patent No.: US 12,755,606 B2
(45) Date of Patent: Oct. 6, 2026

(54) GAMING CASHLESS OPEN BANKING WEB INTEGRATION

(71) Applicant: LNW Gaming, Inc., Las Vegas, NV (US)

(72) Inventors: Jon Christian Wolfe, Las Vegas, NV (US); Naveen Mahendran, Chennai (IN); Jordan Salmon, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 65 days.

(21) Appl. No.: 18/908,227

(22) Filed: Oct. 7, 2024

(65) Prior Publication Data

US 2025/0118159 A1 Apr. 10, 2025

Related U.S. Application Data

(60) Provisional application No. 63/588,830, filed on Oct. 9, 2023.

(51) Int. Cl.

*G07F 17/32* (2006.01)
*G06Q 20/10* (2012.01)
*G06Q 20/26* (2012.01)
*G06Q 20/32* (2012.01)

(52) U.S. Cl.

CPC ....... *G07F 17/3244* (2013.01); *G06Q 20/108* (2013.01); *G06Q 20/26* (2013.01); *G06Q 20/3276* (2013.01)

(58) Field of Classification Search

CPC ... G06Q 20/108; G06Q 20/26; G06Q 20/3276
See application file for complete search history.

(56) References Cited

U.S. PATENT DOCUMENTS

| | | | |
|---|---|---|---|
| 6,835,134 | B2 | 12/2004 | Poole et al. |
| 6,846,238 | B2 | 1/2005 | Wells |
| 6,932,704 | B2 | 8/2005 | Walker et al. |
| 7,004,837 | B1 | 2/2006 | Crowder, Jr. et al. |
| 7,390,263 | B1 | 6/2008 | Acres |
| 7,413,513 | B2 | 8/2008 | Nguyen et al. |
| 7,437,147 | B1 | 10/2008 | Luciano, Jr. |
| 7,611,409 | B2 | 11/2009 | Muir et al. |
| 7,699,703 | B2 | 4/2010 | Muir et al. |
| 7,758,417 | B2 | 7/2010 | Jorasch et al. |

(Continued)

*Primary Examiner* — Omkar A Deodhar

(57) ABSTRACT

A system and method(s) for tracking gaming open banking transactions using anonymous token data. The system and/or method involves operations that launch a microsite (via QR code capture by mobile device) and detect a debit request via the microsite. The microsite is accessible to a casino merchant system and a payment service provider (PSP) system. Operations further obtain, from the PSP system, an anonymous token associated with access to a personal bank account. The anonymous token attributes a certain debit request to the user within the casino system. The method further funds the transaction to a gaming device (e.g., via ACH transaction, FedNow transaction, or other similar funds transfer from the PSP system and via electronic funds transfer within the casino system) using the anonymous token as a reference. In one example, the method includes prohibiting the transaction if a debit limit is exceeded.

21 Claims, 25 Drawing Sheets

(56) References Cited

U.S. PATENT DOCUMENTS

| | | | |
|---|---|---|---|
| 7,967,682 | B2 | 6/2011 | Huizinga |
| 7,976,384 | B2 | 7/2011 | Griswold |
| 8,152,634 | B2 | 4/2012 | Gagner et al. |
| 8,241,123 | B2 | 8/2012 | Kelly et al. |
| 8,251,809 | B2 | 8/2012 | Griswold |
| 8,272,947 | B2 | 9/2012 | Gagner et al. |
| 8,282,465 | B2 | 10/2012 | Giobbi |
| 8,333,655 | B2 | 12/2012 | Gagner et al. |
| 8,393,955 | B2 | 3/2013 | Arezina et al. |
| 8,430,745 | B2 | 4/2013 | Agarwal et al. |
| 8,469,800 | B2 | 6/2013 | Lemay et al. |
| 8,550,903 | B2 | 10/2013 | Lyons et al. |
| 8,597,111 | B2 | 12/2013 | Lemay et al. |
| 8,608,569 | B2 | 12/2013 | Carrico et al. |
| 8,613,659 | B2 | 12/2013 | Nelson et al. |
| 8,613,668 | B2 | 12/2013 | Nelson et al. |
| 8,622,836 | B2 | 1/2014 | Nelson et al. |
| 8,632,403 | B2 | 1/2014 | Nguyen et al. |
| 8,636,590 | B2 | 1/2014 | Griswold |
| 8,721,434 | B2 | 5/2014 | Nelson et al. |
| 8,734,236 | B2 | 5/2014 | Arezina et al. |
| 8,821,274 | B2 | 9/2014 | Lyons et al. |
| 8,827,813 | B2 | 9/2014 | Lemay et al. |
| 8,827,814 | B2 | 9/2014 | Lemay et al. |
| 8,834,254 | B2 | 9/2014 | Buchholz et al. |
| 8,845,416 | B2 | 9/2014 | Schwartz |
| 8,845,422 | B2 | 9/2014 | Weber |
| 8,870,647 | B2 | 10/2014 | Huizinga |
| 8,876,595 | B2 | 11/2014 | Nelson et al. |
| 8,876,596 | B2 | 11/2014 | Patceg et al. |
| 8,926,422 | B2 | 1/2015 | Anderson et al. |
| 8,932,140 | B2 | 1/2015 | Gagner et al. |
| 8,944,916 | B2 | 2/2015 | Abouchar et al. |
| 8,956,224 | B2 | 2/2015 | Gagner et al. |
| 8,961,306 | B2 | 2/2015 | Lemay et al. |
| 9,039,523 | B2 | 5/2015 | Price et al. |
| 9,098,975 | B2 | 8/2015 | Walker et al. |
| 9,123,204 | B2 | 9/2015 | Rader et al. |
| 9,142,098 | B2 | 9/2015 | Gagner et al. |
| 9,147,313 | B2 | 9/2015 | Nelson et al. |
| 9,153,095 | B2 | 10/2015 | Adiraju et al. |
| 9,196,121 | B2 | 11/2015 | Walker et al. |
| 9,218,715 | B2 | 12/2015 | Price et al. |
| 9,224,263 | B2 | 12/2015 | Gagner et al. |
| 9,224,268 | B2 | 12/2015 | Aoki et al. |
| 9,235,953 | B2 | 1/2016 | Earley et al. |
| 9,235,964 | B2 | 1/2016 | Ward et al. |
| 9,240,100 | B2 | 1/2016 | Page et al. |
| 9,269,231 | B2 | 2/2016 | York et al. |
| 9,311,769 | B2 | 4/2016 | Lemay et al. |
| 9,336,647 | B2 | 5/2016 | Nelson et al. |
| 9,355,519 | B2 | 5/2016 | Lyons et al. |
| 9,361,755 | B2 | 6/2016 | Gagner et al. |
| 9,367,835 | B2 | 6/2016 | Nelson et al. |
| 9,375,644 | B2 | 6/2016 | Nelson et al. |
| 9,412,227 | B2 | 8/2016 | Nelson et al. |
| 9,412,228 | B2 | 8/2016 | Arezina et al. |
| 9,424,713 | B2 | 8/2016 | Walker et al. |
| 9,443,384 | B2 | 9/2016 | Price et al. |
| 9,472,049 | B2 | 10/2016 | Allen et al. |
| 9,483,906 | B2 | 11/2016 | Lemay et al. |
| 9,489,794 | B2 | 11/2016 | Hilbert et al. |
| 9,520,023 | B2 | 12/2016 | Lyons et al. |
| 9,520,030 | B2 | 12/2016 | Gagner et al. |
| 9,524,609 | B2 | 12/2016 | Shorrock et al. |
| 9,530,277 | B2 | 12/2016 | Nelson et al. |
| 9,547,954 | B2 | 1/2017 | Anderson et al. |
| 9,552,693 | B1 | 1/2017 | Reeves |
| 9,552,697 | B2 | 1/2017 | Earley et al. |
| 9,564,010 | B2 | 2/2017 | Page et al. |
| 9,595,165 | B2 | 3/2017 | Gagner et al. |
| 9,619,968 | B2 | 4/2017 | Gagner et al. |
| 9,626,832 | B2 | 4/2017 | Patceg et al. |
| 9,640,022 | B2 | 5/2017 | Carrico et al. |
| 9,640,033 | B2 | 5/2017 | Gagner et al. |
| 9,646,452 | B2 | 5/2017 | Parra et al. |
| 9,659,437 | B2 | 5/2017 | Kelly et al. |
| 9,666,027 | B2 | 5/2017 | York et al. |
| 9,697,683 | B2 | 7/2017 | Lyons et al. |
| 9,734,661 | B2 | 8/2017 | Lyons et al. |
| 9,734,667 | B2 | 8/2017 | Walker et al. |
| 9,754,443 | B2 | 9/2017 | Hedrick et al. |
| 9,786,123 | B2 | 10/2017 | Huizinga |
| 9,805,547 | B2 | 10/2017 | Price et al. |
| 9,805,554 | B2 | 10/2017 | Michel et al. |
| 9,811,971 | B1 | 11/2017 | Reeves |
| 9,824,532 | B2 | 11/2017 | Abouchar et al. |
| 9,824,536 | B2 | 11/2017 | Shorrock et al. |
| 9,842,468 | B2 | 12/2017 | Gagner et al. |
| 9,852,578 | B2 | 12/2017 | Nelson et al. |
| 9,875,607 | B2 | 1/2018 | Nelson et al. |
| 9,875,621 | B1 | 1/2018 | Michel et al. |
| 9,928,502 | B2 | 3/2018 | York et al. |
| 9,928,681 | B2 | 3/2018 | Lemay, Jr. et al. |
| 9,997,015 | B2 | 6/2018 | Sylla et al. |
| 10,013,850 | B2 | 7/2018 | Nelson et al. |
| 10,068,417 | B2 | 9/2018 | Toohey et al. |
| 10,068,429 | B2 | 9/2018 | Gagner et al. |
| 10,074,235 | B2 | 9/2018 | Walker et al. |
| 10,102,714 | B2 | 10/2018 | Page et al. |
| 10,109,149 | B2 | 10/2018 | Reeves |
| 10,115,270 | B2 | 10/2018 | Gagner et al. |
| 10,121,312 | B2 | 11/2018 | Allen et al. |
| 10,121,318 | B2 | 11/2018 | Lemay et al. |
| 10,140,811 | B2 | 11/2018 | Lyons et al. |
| 10,140,814 | B2 | 11/2018 | Anderson et al. |
| 10,192,400 | B2 | 1/2019 | Price et al. |
| 10,192,401 | B2 | 1/2019 | Nelson |
| 10,217,317 | B2 | 2/2019 | Nelson et al. |
| 10,217,319 | B2 | 2/2019 | Gagner et al. |
| 10,242,523 | B2 | 3/2019 | Lyons et al. |
| 10,297,105 | B2 | 5/2019 | Lemay et al. |
| 10,332,344 | B2 | 6/2019 | Petersen et al. |
| 10,339,757 | B2 | 7/2019 | Toohey et al. |
| 10,360,763 | B2 | 7/2019 | Higgins et al. |
| 10,373,430 | B2 | 8/2019 | Higgins et al. |
| 10,391,392 | B2 | 8/2019 | Nelson et al. |
| 10,395,465 | B2 | 8/2019 | Bytnar et al. |
| 10,410,471 | B2 | 9/2019 | Gagner et al. |
| 10,417,867 | B2 | 9/2019 | Nelson |
| 10,424,151 | B1 | 9/2019 | Higgins et al. |
| 10,453,297 | B2 | 10/2019 | Lemay et al. |
| 10,460,560 | B2 | 10/2019 | Cunningham, II et al. |
| 10,460,563 | B2 | 10/2019 | Miri et al. |
| 10,510,207 | B2 | 12/2019 | Lyons et al. |
| 10,529,191 | B2 | 1/2020 | Anderson et al. |
| 10,573,129 | B2 | 2/2020 | Higgins et al. |
| 10,607,437 | B2 | 3/2020 | Little et al. |
| 10,607,442 | B2 | 3/2020 | Toohey et al. |
| 10,621,824 | B2 | 4/2020 | Petersen et al. |
| 10,621,826 | B2 | 4/2020 | Higgins et al. |
| 10,643,423 | B2 | 5/2020 | Lyons et al. |
| 10,643,424 | B2 | 5/2020 | Yee et al. |
| 10,643,431 | B2 | 5/2020 | Chesworth et al. |
| 10,672,225 | B2 | 6/2020 | Reeves |
| 11,069,187 | B2 | 7/2021 | Reeves |
| 11,663,884 | B2 * | 5/2023 | Toohey ............... G07F 17/3244 705/41 |
| 11,900,408 | B1 * | 2/2024 | Sandgren ........... G06Q 30/0211 |
| 2013/0065666 | A1 | 3/2013 | Schueller et al. |
| 2013/0065686 | A1 | 3/2013 | Lemay et al. |
| 2014/0256407 | A1 | 9/2014 | Graf et al. |
| 2016/0012465 | A1 * | 1/2016 | Sharp .................. G06Q 20/321 705/14.17 |
| 2016/0042599 | A1 | 2/2016 | Toohey et al. |
| 2017/0316640 | A1 | 11/2017 | Steil et al. |
| 2019/0197830 | A1 | 6/2019 | Petersen et al. |
| 2021/0082244 | A1 | 3/2021 | Schwartz |
| 2021/0104118 | A1 | 4/2021 | Schwartz |
| 2022/0374874 | A1 * | 11/2022 | Irwin, Jr. ............. G06Q 20/367 |
| 2023/0177914 | A1 | 6/2023 | Jesudoss et al. |

(56) References Cited

U.S. PATENT DOCUMENTS

| | | | | |
|---|---|---|---|---|
| 2023/0274382 A1* | 8/2023 | Fowler | H04N 21/4524 | 705/75 |
| 2024/0062628 A1* | 2/2024 | Hufnagl-Abraham | G07F 17/3241 | |
| 2025/0104514 A1* | 3/2025 | Baerlocher | G07F 17/3239 | |

* cited by examiner

GAMING CASHLESS OPEN BANKING WEB INTEGRATION

CROSS-REFERENCE TO RELATED APPLICATION(S)

This patent application claims priority benefit of U.S. Provisional Patent Application No. 63/588,830 filed Oct. 9, 2023. The disclosure of the 63/588,830 Application is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2024, LNW Gaming, Inc.

FIELD

The present invention relates generally to apparatus and methods for cashless game funding.

BACKGROUND

Wagering game apparatus, such as gaming tables, slot machines, video poker machines and the like, have been a cornerstone of the gaming industry for several years. Generally, the popularity of such apparatus depends on the likelihood (or perceived likelihood) of winning money at the apparatus and the intrinsic entertainment value of the apparatus relative to other available gaming options. Where the available gaming options include a number of competing wagering game apparatus and the expectation of winning at each apparatus is roughly the same (or believed to be the same), players are likely to be attracted to the most entertaining and exciting apparatus as well as those apparatus, or systems, that are easy to use. Funding a gaming session has typically been performed using a form of physical value, such as cash or physical vouchers. However, many patrons find value in being able to fund gaming sessions without the use of cash or physical vouchers, such as via cashless payment instruments. However, use of cashless payment instruments can often result in overspending. Further, cashless payment instruments, such as payment cards, can be difficult for casinos to track (e.g., regarding debit limits) when used anonymously within a casino (e.g., when used without a player account). Furthermore, some regulatory standard groups (e.g., the Payment Card Industry Security Standards Counsel (PCI SSC), the Payment Application Data Security Standard (PA-DSS), etc.) can require strict regulatory security standards that may be onerous and/or cost-prohibitive for many businesses (including casinos) to meet. Therefore, there is a continuing need for wagering game machine manufacturers to continuously develop gaming features (e.g., innovative cashless funding features) that will improve the gaming experience for players and that will protect players' interests regarding gaming debit limits, without requiring burdensome compliance requirements by casinos.

SUMMARY

According to an embodiment of the present disclosure, a method and/or system to perform operations to connect, in response to QR code capture, a user computing device to a microsite accessible to a casino merchant system and a payment service provider (PSP) system. The operations further perform an open banking verification to access an online banking payment instrument associated with a user of the user computing device. The operations further submit a debit request for a requested amount from the online banking payment instrument. The PSP system provides, in response to submission of the debit request, an anonymous token associated with a selection of the online banking payment instrument. The operations further fund, using the anonymous token as a reference, the debit request to an anonymous digital wallet account of the casino merchant system; and performing, via communication between the casino merchant system and the player interface device using the anonymous token as a reference to the anonymous digital wallet account, an authorized gaming funds transfer that can perform at least one of (a) adding a corresponding amount of credits to a credit meter of a gaming machine, (b) printing, from a printer communicatively coupled to the player interface device, a voucher which can be exchanged for a corresponding amount of gaming chips at a gaming table, or (c) adding a corresponding amount of virtual casino chips associated with the requested amount to a meter associated with the player interface device.

Additional aspects of the invention will be apparent to those of ordinary skill in the art in view of the detailed description of various embodiments, which is made with reference to the drawings, a brief description of which is provided below.

Figure 1:
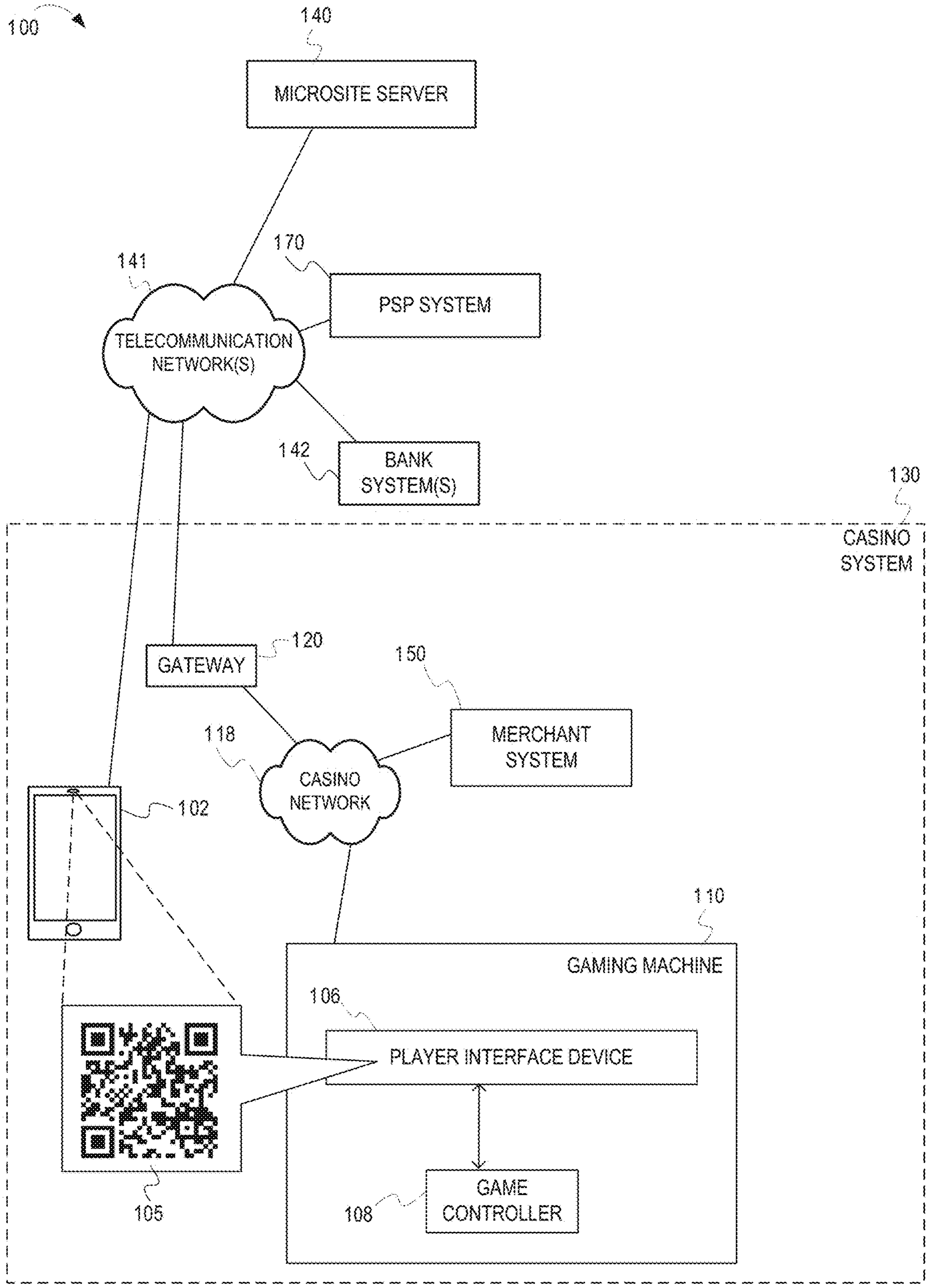
FIG. 1 is a diagram of an example network according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, at least some embodiments with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is a diagram of an example network ("network 100") according to one or more embodiments of the present disclosure. The network 100 includes several components (e.g., systems, devices, etc.) including a payment service provider (PSP) system 170, a microsite server 140, and a casino system 130 communicatively coupled (e.g., connected within the network 100) to each other via one or more telecommunication networks (e.g., "telecommunication network(s) 141"). In some embodiments, the telecommunication network(s) 141 include, but are not limited to, the Internet, a computer network, a cell phone communication network, etc. The casino system 130 includes a merchant system 150 configured to receive, (e.g., via a webhook) from the PSP system 170, one or more online banking payments originated via a user computing device 102 associated with the casino system 130 (e.g., the user computing device 102 is a mobile device of a user seated at gaming machine 110). The merchant system 150 is configured for access and use within a licensed and/or regulated casino or casino network. In some instances, the merchant system 150 may be referred to as a "casino merchant system." The user computing device 102 is configured to scan a QR code 105 (generated by the merchant system 150) to launch a microsite hosted by a microsite server 140. The microsite server 140 runs a PSP client and a merchant client configured to communicate with the PSP system 170 and the merchant system 150 via application programming interfaces (APIs). The microsite is a webpage used only for transactions between the merchant system 150 and a third party, digital payment service provider system (e.g., PSP system 170). One example of a PSP is a digital payment provider that offers a bank-independent payment service (i.e., an open banking service) that makes it possible for consumers to fund transactions directly from their bank account (e.g., via a tool to facilitate online payments from one or more of a plurality of bank system (bank system(s) 142) to the merchant system 150 via the PSP system 170). Open banking allows for financial data to be shared between banks and third-party PSPs through the use of APIs. Traditionally, banks have kept customer financial data within their own closed systems. Open banking allows customers to electronically share their financial information securely with other authorized organizations, such as the PSP. In one example the PSP system 170 uses a bank-as-a-service platform (BaaS platform). In one embodiment, the PSP system 170 is associated with a licensed payment service provider authorized, within a given jurisdiction, to facilitate (via an open banking protocol) digital/online banking transfers from one or more bank systems (e.g., bank system(s) 142) as payments (e.g., via Automated Clearing House (ACH) transactions, FedNow transactions, or other similar funds transfers) to the merchant system 150. The bank system(s) 142 are associated with a user or player of gaming machine 110 (i.e., at least one of bank system(s) 142 is for a personal bank used by the user/player).

The PSP system 170 is subject to regulation. For example, a PSP must be a licensed payment institution authorized by one or more governing organizations, authoritative bodies, jurisdictional rules, etc. to provide authorized and secure financial transactions within a given jurisdiction. For example, in Europe a PSP includes an entity that is a licensed payment institution holding a European Payment Services Provider (PSP) license in accordance with the Payment Services Directive.

Figure 2:
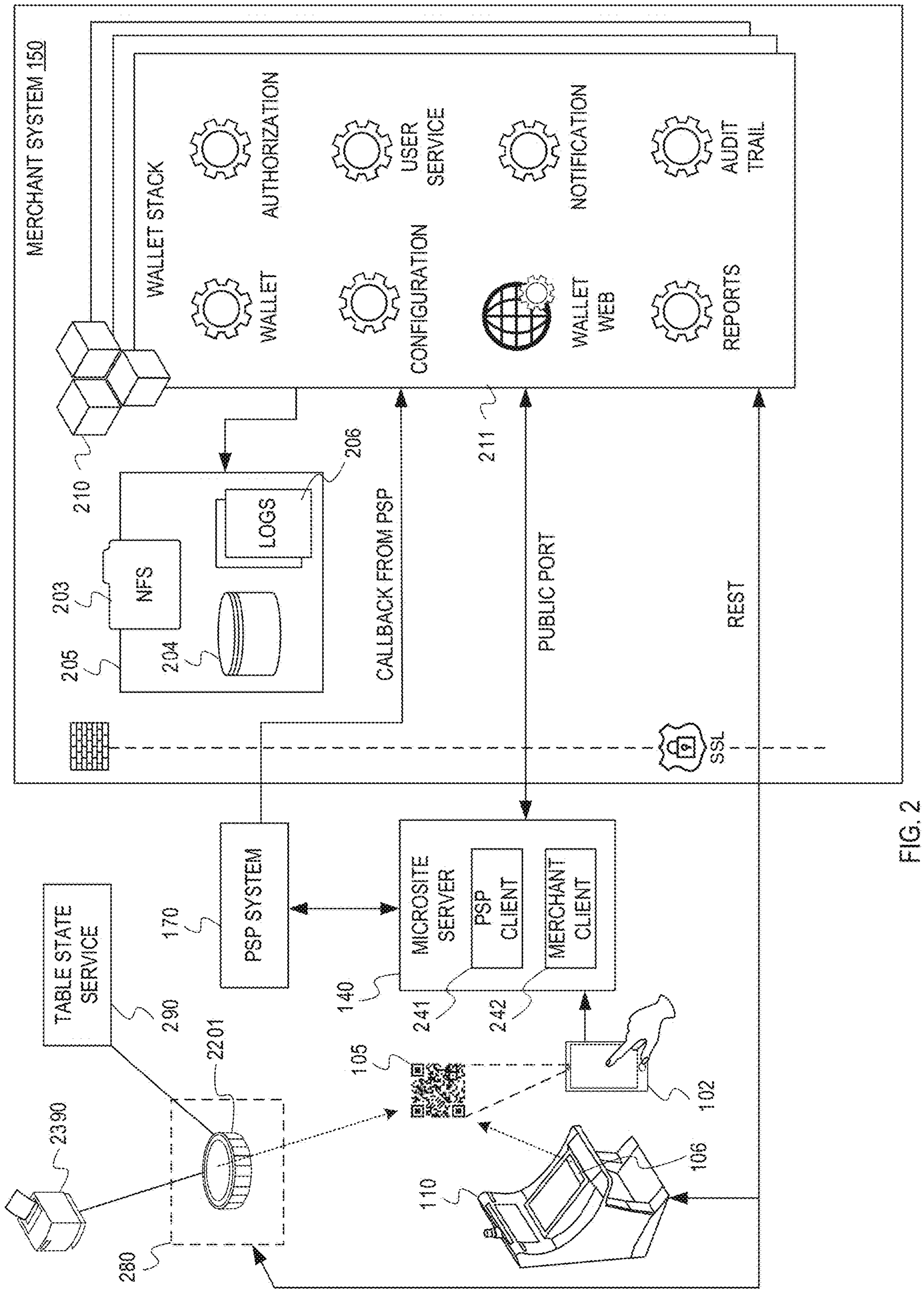
FIG. 2 is an architecture diagram according to one or more embodiments of the present disclosure.

The gaming machine 110 is part of the casino system 130. The gaming machine 110 is connected to the merchant system 150 via casino network 118. Devices that are not a part of the casino system 130 may be connected via a gateway 120 to the casino network 118. The gaming machine 110 includes a player interface device 106 (e.g., an iView® player interface device manufactured by Light & Wonder, Inc.) communicatively connected to the gaming machine 110 (e.g., connected via Universal Serial Bus (USB) connection). An example description of the iView® player interface device can be found in U.S. Pat. No. 8,241,123 to Kelly et al., the entirety of which is hereby incorporated by reference. The gaming machine 110 also includes a game controller 108 configured, via game-logic circuitry (e.g., game-logic circuitry 1940 shown in FIG. 19) to control regulated gaming activity (e.g., via a Slot Accounting System (SAS) protocol) such as for managing wagering activities (e.g., bets of monetary credits) associated with a credit meter of the gaming machine 110 (e.g., see credit meter 680 shown in FIG. 6). In some embodiments, the player interface device 106 is communicatively coupled to the game controller 108 and is configured to communicate with the game controller 108. In some embodiments, the player interface device 106 can intercept an image feed of gaming content from the game controller 108 and rescale the gaming content to fit as a picture-in-picture within a player user interface that presents system-based content, such as content related specifically to a player account (such as customer loyalty benefit information, earned rewards points, player funds, promotions, bonus games, etc.). In one embodiment, the player interface device 106 presents (e.g., via a display of the gaming machine 110) the QR code 105 which can be scanned by an image sensor of the user-computing device 102 (e.g., via a mobile-device camera) and decoded to detect, from the QR code, a URL for the microsite. In another embodiment, a gaming table (e.g., gaming table 280) can be used in place of gaming machine 110 or in addition to gaming machine 110. Furthermore, a player interface device can be incorporated into a gaming table (e.g., player interface device 2201 incorporated into gaming table 280 as shown in FIG. 2 and/or FIG. 23).

In some embodiments, the merchant system 150 includes, or is associated with, a casino management system ("CMS") which is communicatively coupled to the player interface device 106 (also via the casino network 118). The merchant system 150 is authorized to perform transactions with, and/or to securely communicate with, the player interface device 106. For example, the merchant system 150 is configured to transmit authorization instructions to the player interface device 106 to fund a game controller 108 via a cashless funds transfer. In some embodiments, the merchant system 150 may be referred to as a "player tracking system," a "patron management system," a "cashless casino system," etc., or more generally as, or part of, the casino system 130. In one embodiment, merchant system 140 provides (via the player interface device 106) "system-based content" and/or "system-based services." The system-based content and/or system-based services may include, but are not necessarily limited to, content related to player benefits, casino services, marketing bonuses, promotions, advertisements, beverage or dining services, or any other information that is relevant to the player's gaming experience other than the wagering game itself. Content for a wagering game may be referred to as game content. Game content, for instance, includes game assets of the wagering game, content related to a bet placed on the game (e.g., bet meters, pay tables, payout/collection, credit meters, number of lines selected for betting, an amount bet per line, a maximum bet, etc.), game play elements of the game (e.g., reels, indicia, game symbols,), game instructions, etc. Examples of the merchant system 150 include, but are not limited to, one or more of the ACSC Casino Management System™ product available from Light & Wonder, Inc., the SDS™ slot-management product, the CMP™ player-tracking product available from Light & Wonder, Inc., the Elite Bonusing Suite™ product available from Light & Wonder, Inc, the Unified Wallet product available from Light & Wonder, Inc, some combination of the listed products, etc.

In some embodiments, elements of the casino system 130, such as the gateway 120, the merchant system 150, and/or player interface device 106 are configured, and/or authorized, to coordinate communications with the PSP system 170 to track an anonymous token provided by the PSP system 170. The anonymous token can be any non-sensitive, surrogate value, or in other words a non-sensitive equivalent to one or more sensitive data elements within the transaction data. For instance, in some embodiments, the anonymous token is a number and/or text string that is generated and stored by the PSP system 170. The anonymous token is used, by the merchant system 150, to anonymously track open banking transactions associated with a particular user or player without needing to know sensitive bank account information and without needing to know identifying information about the user/player. For instance, the PSP system 170 provides the anonymous token to the merchant system 150 to track transaction communications and/or for storage in records associated with the open banking transaction(s) initiated via the microsite server 140 by the user. The anonymous token is a value, generated and stored by the PSP system 170, to uniquely identify use, by the same user, of one or more online banking payment instruments (e.g., personal bank accounts) accessible to the user. In some embodiments, the merchant system 150 can aggregate debit values from the records to determine whether debit limits are being exceeded for a given period. The merchant system 150 can further prohibit the funding transaction if the limit would be exceeded and provide a message (via the microsite and/or via the player interface device 106) about the limit being exceeded. In some embodiments, the merchant system 150 can also automatically modify the requested debit amount so that it does not exceed the limit.

The user computing device 102 (e.g., a smartphone, a tablet, a personal mobile device, etc.) is configured to present a web browser application (or other such mobile application) configured to load a Universal Resource Locator (URL) address and present a microsite webpage hosted by the microsite server 140.

By storing and tracking anonymous tokens from the PSP system 170, the network 100 is able to provide a way for a player to use their bank account to purchase gaming credits and to automatically manage (e.g., allow or deny) transactions that may exceed debit limits, even if the player account is not logged into the player interface device 106. When the open banking transaction is authorized and not prohibited (e.g., if no debit limit is exceeded), then the network 100 (e.g., via the player interface device 106 and/or the merchant system 150) performs an electronic funds transfer from an anonymous digital wallet account (e.g., as managed by the merchant system 150) to the game controller 108. For example, the player interface device 106 can control and communicate data (e.g., gaming credit information) directly to the game controller 108 via a Slot Accounting System (SAS) funds transfer, via a virtual Ticket-In-Ticket-Out (TITO) procedure, etc. For example, in one embodiment, the merchant system 150 and/or the player interface device 106 use a protocol for electronic transfer of funds (referred to herein as "funds transfer") to add the amount of the open banking transaction to a credit meter of the gaming machine 110. The protocol for the funds transfer includes, but is not limited to, the Advanced Funds Transfer (AFT) protocol or the Electronic Funds Transfer (EFT) protocol. AFT is a secure technology for transferring funds between a gaming machine (e.g., the gaming machine 110) and a casino accounting system (e.g., the merchant system 150).

The network 100 supports responsible gaming by automatically detecting (and enforcing) debit limits associated with open banking transactions in embodiments where a player is logged into a player account (i.e., a "carded" player) and also in embodiments where the player is not logged into a player account (i.e., an "uncarded" player or "anonymous" player). The network 100 also protects a player's financial information to prevent unauthorized transactions, and removes any need to interact with an operator employee to fund the gaming machine 110.

FIGS. 2, 3, 4, 5, 6, 7A, 7B, 8A, 8B, 8C, 9A, 9B, 10A, 10B, 10C, 11A, 11B, 12A, 12B, 12C, 13A, 13B, 14A, 14B, 15A, 15B, 16A, 16B, 17, 18, 22A, 22B, 22C, 22D, 23, 24, and 25 describe additional embodiments of logging into a gaming device (e.g., gaming machine 110 and/or gaming table 280) and funding, via an open banking transaction(s), a gaming session or gaming activity using an anonymous token to track the open banking transaction(s) (e.g., to store tokens in association with a player account identifier, to search unique anonymous token data against past transaction records when no player account identifier is known, to authorize or reject amounts that would exceed gaming debit limits associated with the token(s) and/or player account identifier, etc.).

FIG. 2 is an architecture diagram according to one or more embodiments of the present disclosure. FIG. 2 illustrates the gaming machine 110, player interface device 106, gaming table 280, player interface device 2201, table state service 290, printer 2390, user computing device 102, microsite server 140, PSP system 170, and merchant system 150 described in FIG. 1. Furthermore, the microsite server runs a PSP client 241 (configured to communicate with the PSP system 170) and a merchant client 242 (configured to communicate with the merchant system 150). The merchant system 150 also includes a data storage system 205 (e.g., with a network file system (NFS) 203, a database 204 (e.g., see also database 1702), one or more log files 206 (e.g., to track and/or manage database transactions), etc.). The merchant system 150 manages a digital wallet stack 211 for various nodes 210. The wallet stack 211 includes various elements to control a digital wallet, to perform authorizations, to perform configurations, to manage a user service, to provide access online to the digital wallet, to provide notifications, to generate reports, to maintain an audit trail, etc. The PSP client 241 and the merchant client 242 each communicate with the merchant system 150 via a public port (e.g., to present the microsite webpage). The PSP system 170 and the merchant system 150 can further be connected via a webhook configuration via which the PSP system 170 can perform a callback operation (e.g., see processing block 318 in FIG. 3 for more details). In one embodiment, the merchant system 150 and the gaming machine 110 or gaming table 280 communicate via a representational state transfer (REST) architectural system. REST defines a set of constraints for how the architecture of an Internet-scale distributed hypermedia system, such as the Web, should behave. The REST architecture enables a server to respond with a representation of a resource (e.g., via HTML, XML or JSON document) and that resource will contain hypermedia links that can be followed to make the state of the system change. Any such request will in turn receive the representation of a resource, and so on. In one embodiment, the table state service 290 is associated with a server or other devices, such as, but not limited, use of internet-of-things (IOT) technology (e.g., via a network of physical objects, such as smart devices, cameras, projector, player interface devices, printers, game controllers, displays, servers, table devices (e.g., chip tray, dealer station devices, player station devices, etc.), and so forth), which permits embedded sensors, software, technologies for connecting and exchanging data with other devices and systems over the Internet or other communication networks (e.g., via communications with and/or between PSP system 170, microsite server 140, merchant system 150, etc., via REST architecture communications, via communications using wireless technology (e.g., Bluetooth™ mesh networking, light fidelity (Li-Fi), near-field communication (NFC), radio-frequency identification (RFID), WiFi™ wireless network protocols, personal area networking, 5G™ wireless networks, LoRa™ radio communication, DASH7 protocol, low-power wide-area networking, etc.), and so forth). The table state service 290 may further provide aggregation of events that occur via the gaming table 280 (e.g., events that occur and/or are detected via one or more of sensors including the player interface device 2201, via tracking of gaming table actions detected via user input, via tracking actions that occur via use of connected user devices (e.g., via NFC between smart devices and the player interface device 2201), via detection and analysis of activity of gaming-table participants by gaming table devices (e.g., via table or environmental image sensors, via dealer input at dealer station about players or gaming activity, via chip tray sensors, via bet sensors, via player interface devices, via shuffler sensors, via shoe sensors, etc.), via other technologies (e.g., via machine learning model object detection and/or segregation, via embedded systems, via wireless sensor networks, via control systems, via automation technologies, via edge gateways, etc.), and so forth).

Figure 3:
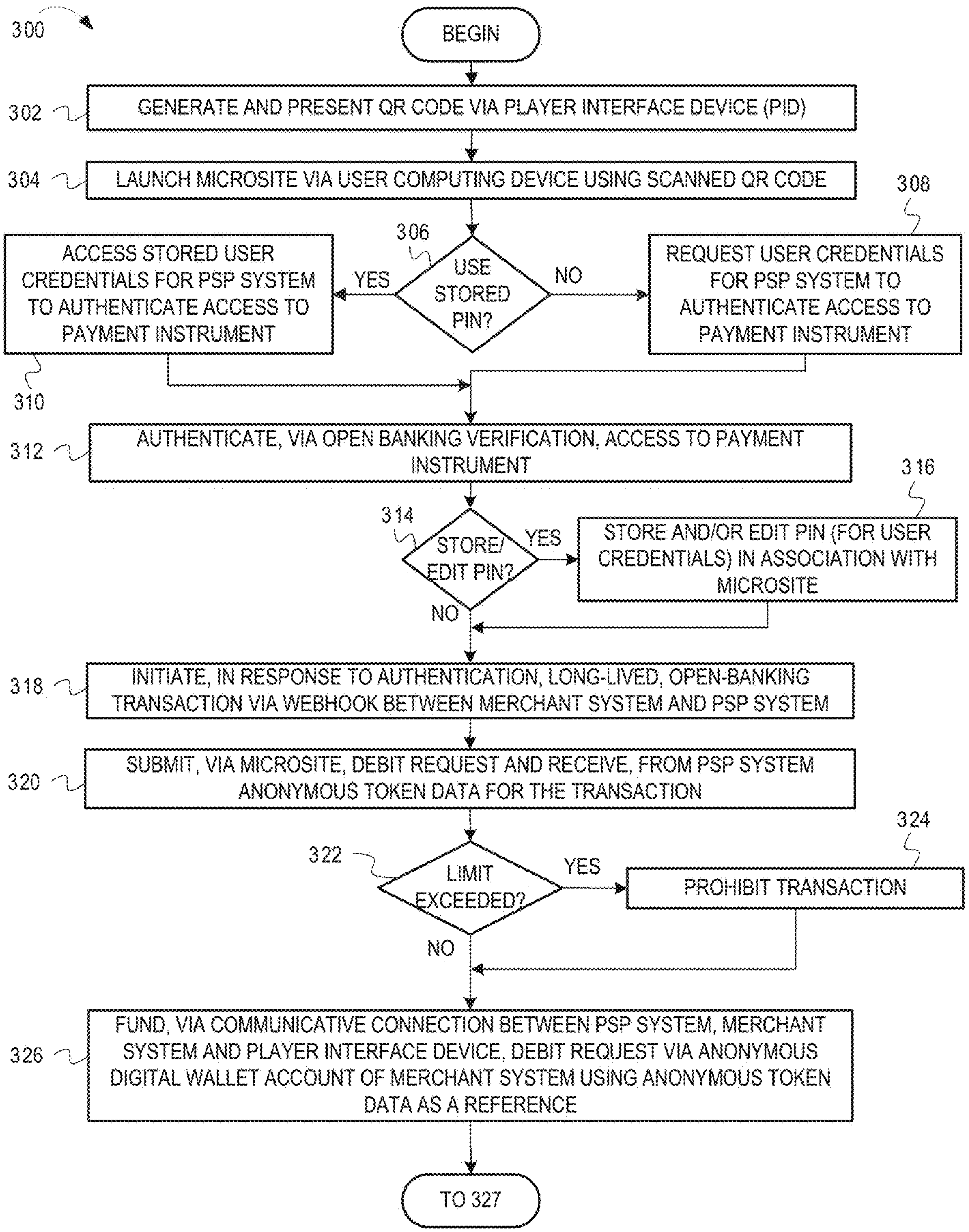
FIG. 3 and FIG. 21 illustrate an example of a method flow of automatically managing open banking transactions for gaming using anonymous token data according to one or more embodiments of the present disclosure.
Figure 4:
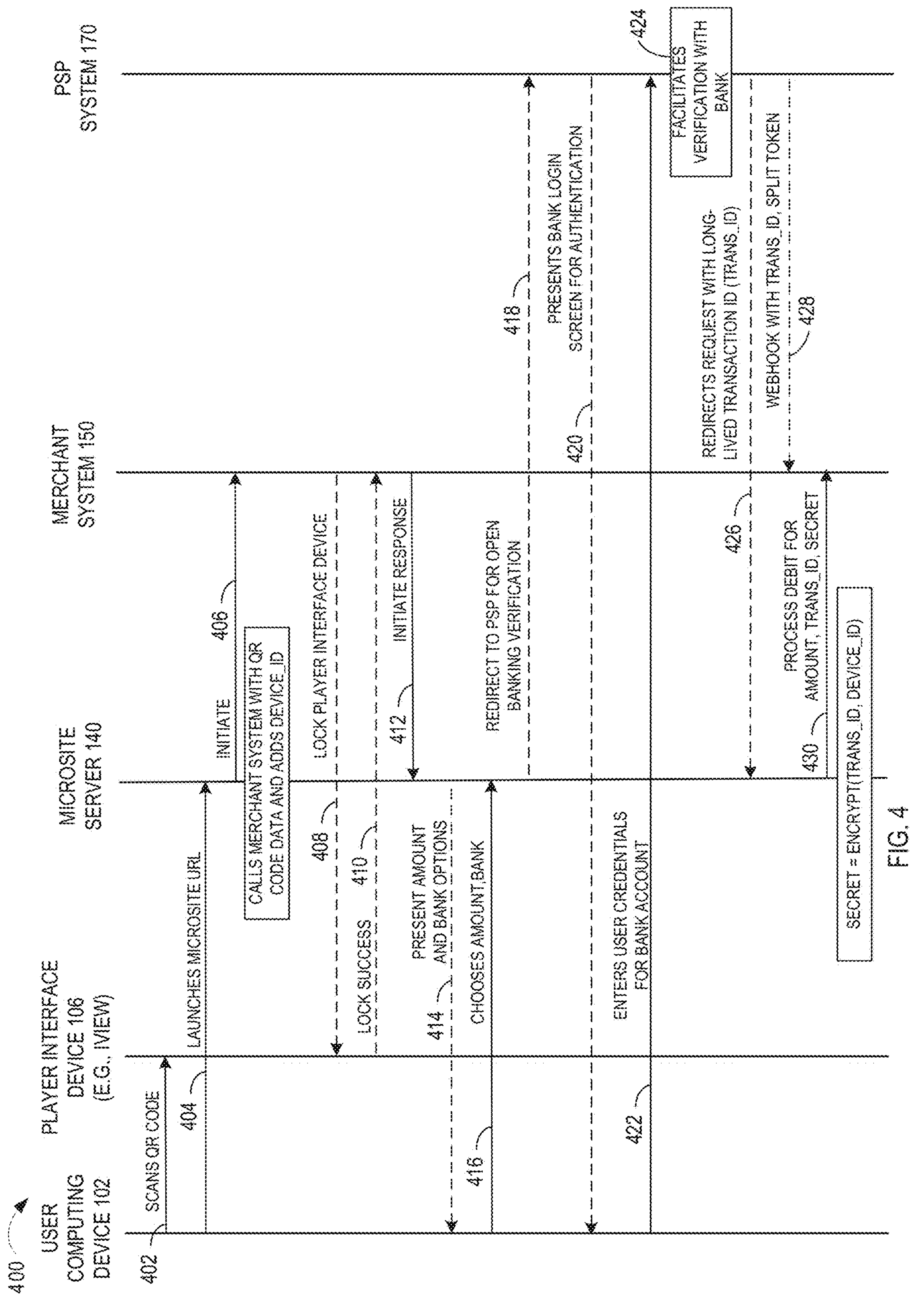
FIGS. 4 and 5 illustrate an example data flow for managing one or more open banking transactions for gaming using anonymous token data according to one or more embodiments of the present disclosure.
Figure 5:
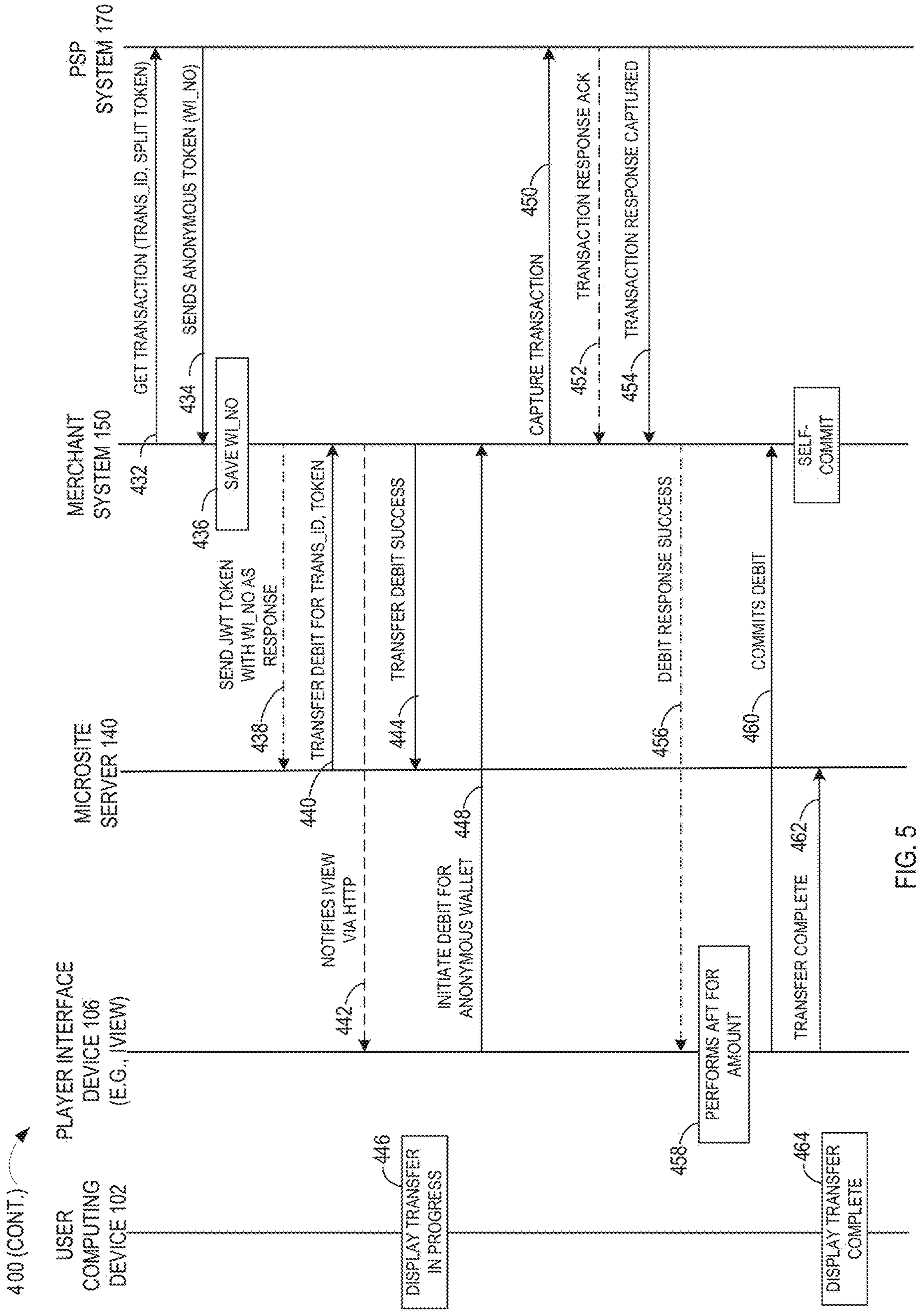
Figure 15A:
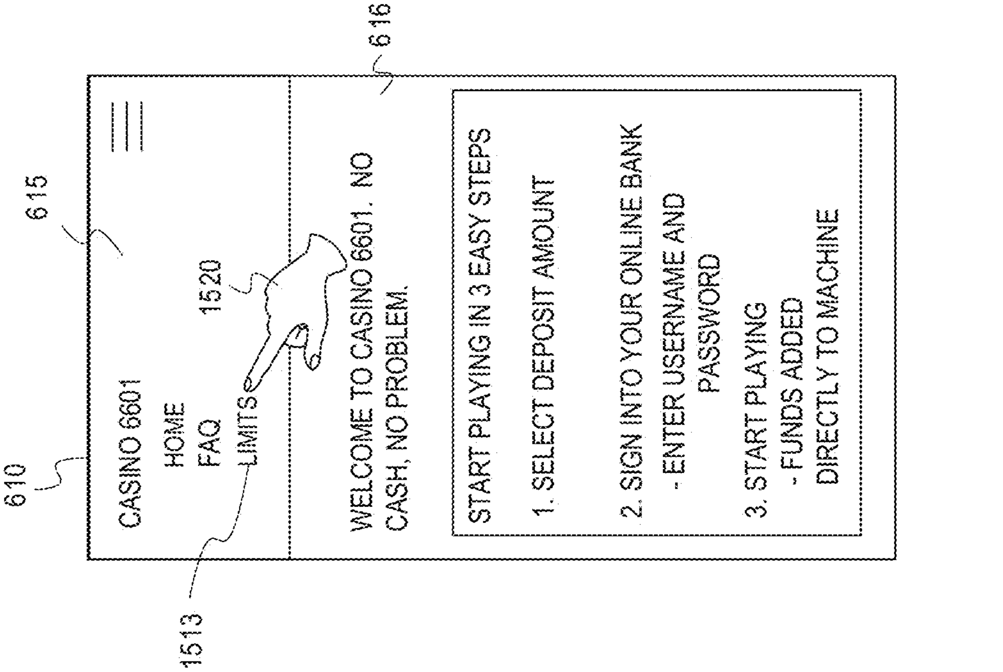
Figure 15B:
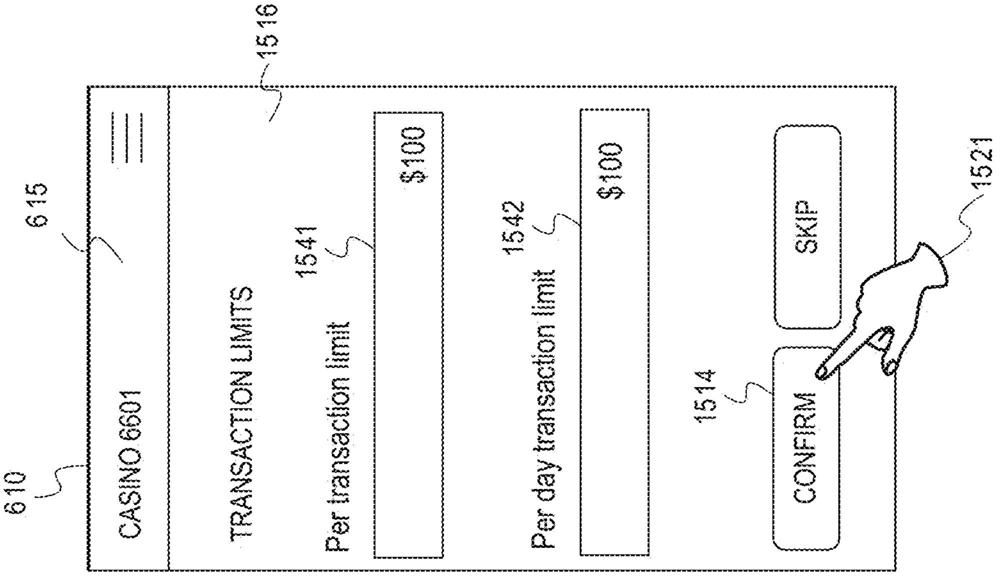
Figure 16A:
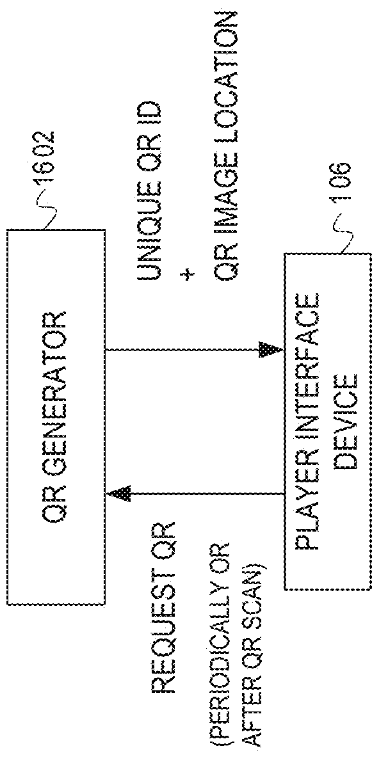
Figure 16B:
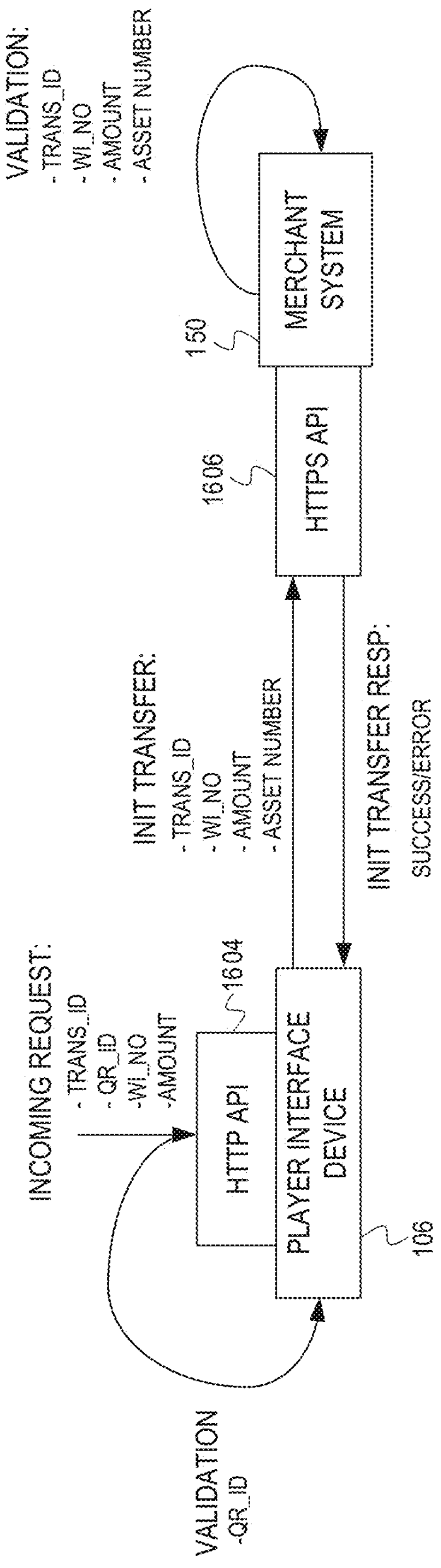
Figure 17:
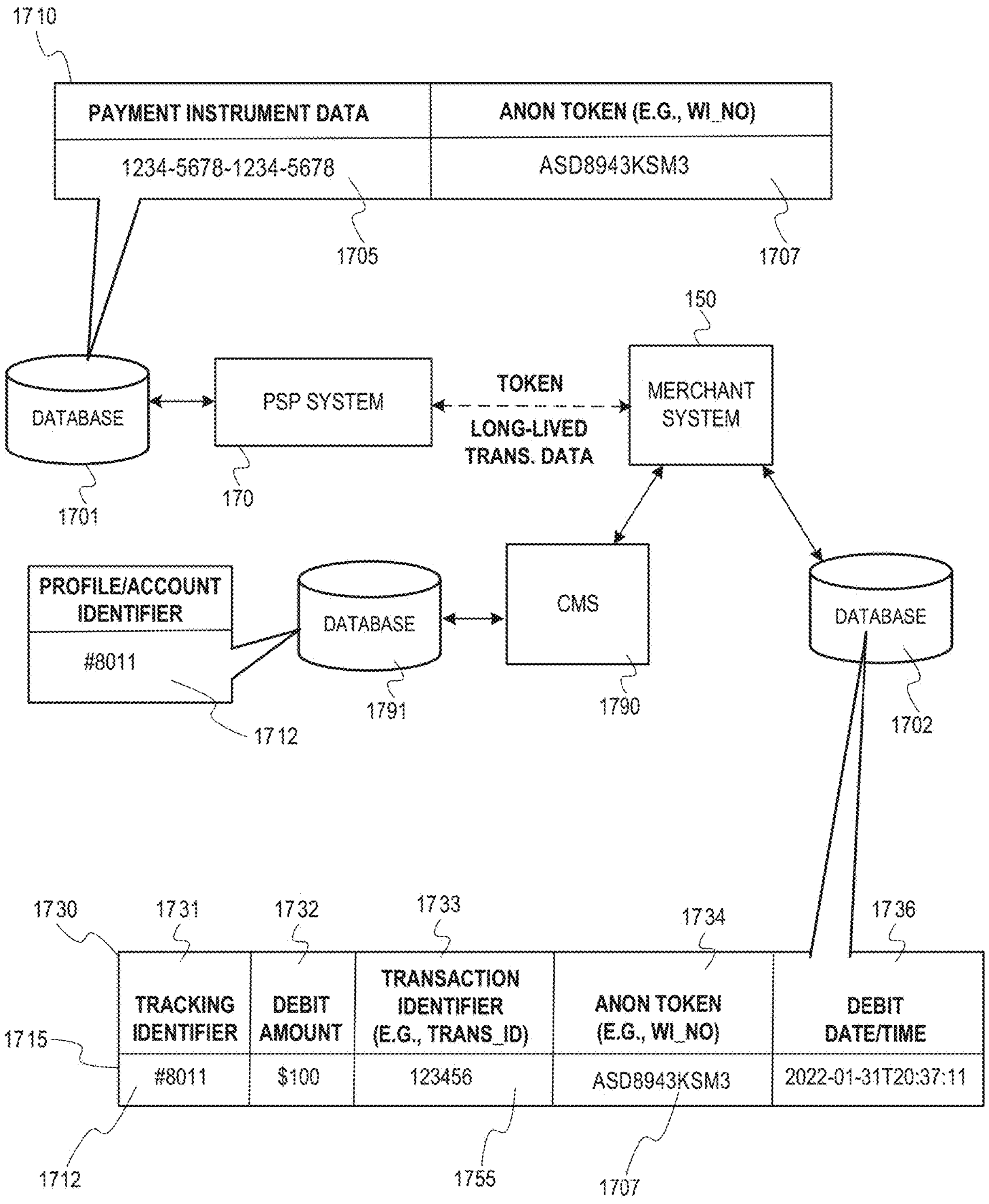
Figure 18:
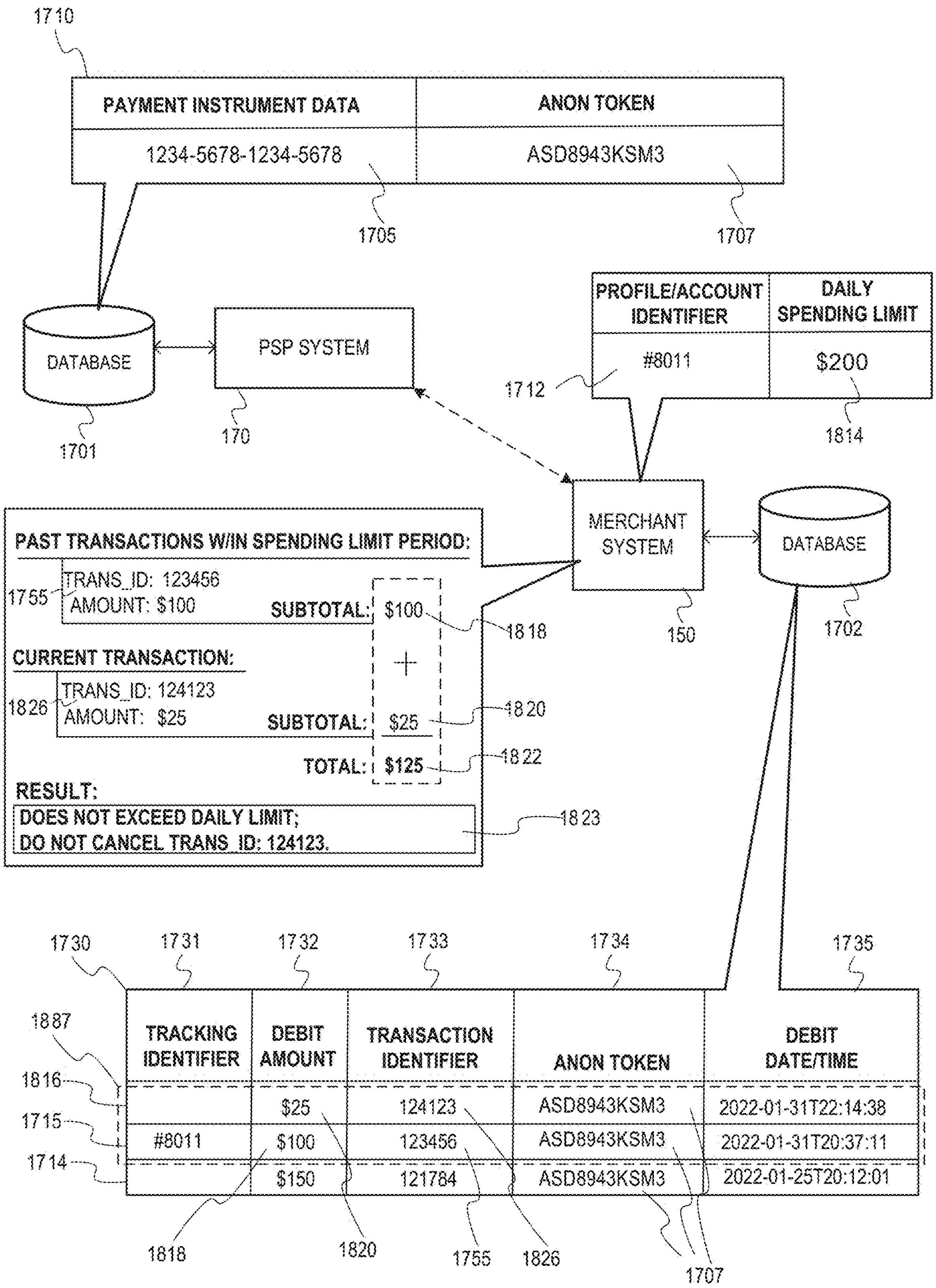
Figure 22A:
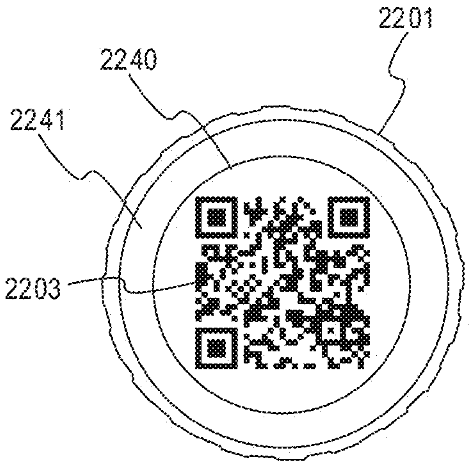
FIGS. 22A, 22B, 22C, and 22D illustrate examples of a player interface device according to one or more embodiments of the present disclosure.
Figure 22B:
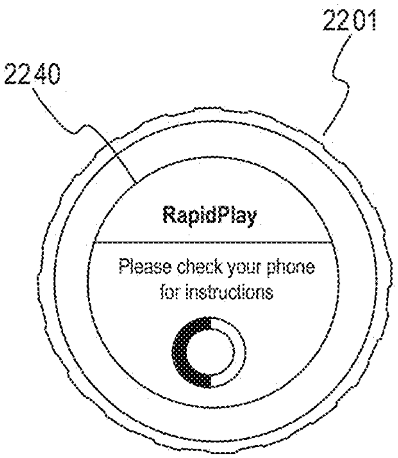
Figure 22C:
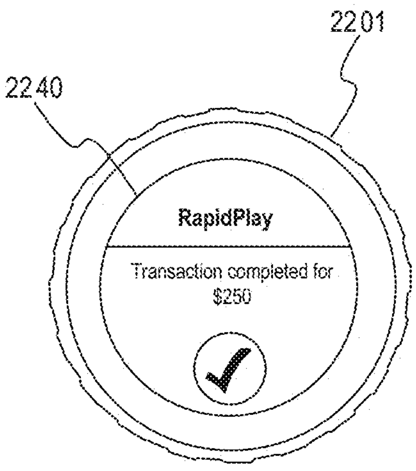

FIG. 3 illustrates an example of a method flow ("flow 300") of automatically managing open banking transactions using anonymous token data according to one or more embodiments of the present disclosure. The description of FIG. 3 refers to a "processor" that performs operations associated with the flow 300. It should be noted that the reference to the processor may refer to the same physical processor or it may be one of a set of a plurality of processors. The set of processors may operate in conjunction with each other and may be distributed across various networked devices (e.g., across the network 100). The types of processors may include a central processing unit, a graphics processing unit, any combination of processors, etc. In one embodiment, the processor may be included in, or refer to, to one or more devices of the network 100, such as any one of the devices connected via the casino network 118 (e.g., gateway 120, merchant system 150, gaming machine 110, gaming table 280, player interface device 106, player interface device 2201, etc.) or any device connected via the telecommunications network 141 (e.g., the PSP system 170, the table state service 290, the microsite server 140, etc.). In one embodiment, the processor may be the central processing unit (CPU) 1942 (see FIG. 19) or a processor in another device mentioned herein, such as a processor associated with the computer 2000, a table controller, a card-handling device, a camera controller, a game controller, a gaming server etc. In some embodiments, the description of FIG. 3 will refer to FIGS. 1, 4, 5, 6, 7A, 7B, 8A, 8B, 8C, 9A, 9B, 10A, 10B, 10C, 11A, 11B, 12A, 12B, 12C, 13A, 13B, 14A, 14B, 15A, 15B, 16A, 16B, 17, and 18. FIGS. 4 and 5 illustrate an example data flow ("flow 400") according to one or more embodiments of the present disclosure. FIGS. 4 and 5 will be referenced in the description of FIG. 3 as one example of detailed data flow elements representative of the flow 300, which detailed flow elements occur, for example, by the devices and/or systems described in FIG. 1 and/or FIG. 2. Furthermore, the description of FIGS. 6, 7A, 7B, 8A, 8B, 8C, 9A, 9B, 10A, 10B, 10C, 11A, 11B, 12A, 12B, 12C, 13A, 13B, 14A, 14B, 15A, 15B, illustrate examples of user interfaces presented by the user computing device 102, the player interface device 106, the gaming machine 110, etc. during the flow 300 (and/or during the flow 400). FIGS. 16A and 16B illustrate an example of use of a QR generator and/or communications, of QR data, transaction data, tokens, etc. via one or more APIs associated with the player interface device 106 and the merchant system 150. Furthermore, FIGS. 17 and 18 illustrate examples of tracking and/or enforcing debit limits based on anonymous token data provided by the PSP system 170. Additionally, FIGS. 22A, 22B, 22C, 22D, 23, 24, and 25 illustrate examples of user interfaces presented by the user computing device 102, the player interface device 2201 (with similar functionality as player interface device 106 and configured to be embedded into a player station at gaming table 280). FIGS. 22A, 22B, 22C illustrate an example of the player interface device 2201 at various example stages that may occur during either the flow 300 or 400 according to one or more embodiments. The various example stages are further displayed in more detail in FIGS. 23, 24, and 25. For example, FIG. 22A is associated with the description of FIG. 23. FIG. 22B is associated with the description of FIG. 24. FIG. 22C is associated with the description of FIG. 25.

Referring to FIG. 22A, the player interface device 2201 includes a display 2240 (e.g., an LED display) in which content is displayed (e.g. content related to open banking transactions, content related to gaming, content related to patron promotions or loyalty accounts, etc.). In one embodiment, the player interface device 2201 has a puck shape (e.g., a cylindrical shape with short side walls). The player interface device 2201 is integrated with (e.g., embedded into, attached to, etc.) gaming table 280, such as via one or more holes drilled into the table surface into which the player interface device 2201 is inserted. In one embodiment the top portion of the player interface device 2201 includes a display. The player interface device 2201 can be positioned within the hole such that the top of the player interface device 2201 (the display) is flush with the table surface, thus appearing to the player as a sensor/display. In one embodiment, player interface device 2201 can have a mechanism to raise or expose access to the player interface device 2201 during configuration or during certain gaming states (e.g., for access by the dealer or other operator employees to change functions, menus, options, etc. of the player interface device 2201, for access by player to press buttons related to gaming activities, responsible gaming practices, funds access, account access, etc., and so forth). In other examples, the player interface device 2201 can be positioned such that the bottom of the player interface device 2201 is flush with the table surface, thus exposing the side walls of the player interface device 2201 to the participants during play (e.g., for use by participants to interface with the player interface device 2201 during betting, during game play, during breaks, etc.). In one embodiment, the player interface device 2201 can be situated inside the cylinder or they can be part of the player interface device 2201 situated below the table surface.

The player interface device 2201 can enclose components (e.g., sensors, processors, memory, wireless communications devices, etc.), such as an NFC communication device. In one embodiment, the NFC communication device enables an automatic wireless login via interaction with the NFC-enabled mobile device. The NFC device can communicate with a mobile application (e.g., a web browser application, or other such mobile application, configured to load a Universal Resource Locator (URL) address associated with a microsite webpage) during login as well as during a gaming session (e.g., to transfer/receive information about gaming events that occur during the gaming session). The player interface device 2201 can include rotatable functions as well as button functions. For example, the player interface device 2201 can include a rotatable portion, such as a knob or dial (e.g., constituting the rotatable side-walls connected to a rotatable frame) as well as buttons incorporated into the side of the rotatable walls. The rotatable portion can be spun to select different modes, menus, options, etc., and the rotatable walls can be spun to select different modes, menus, options, etc. and/or sub-modes, sub-menus, sub-options, etc. (or vice versa). The walls of the rotatable portion can be made of soft material, such as rubber, so that buttons can be hidden underneath the soft rubber and accessed by pressing the button through the rubber walls. The rotation and/or buttons can be used by an operator employee to configure the player interface device 2201 for use before, after, or during a game play session. In other embodiments, the rotation and/or buttons can be used by a dealer or player to set or reset certain options (e.g., to restart a time after a break in play).

In one embodiment, the player interface device 2201 includes a round face which includes the display 2240 (e.g., an LED display positioned over internal NFC sensing devices). The LED display can present information (e.g., instructions, status, details, QR codes, etc.) related to login as well as during a gaming session. In some embodiments, the display 2240 can include one or more display portions. For example, the display portions can include an outer display 2241 (e.g., an outer LED ring surrounding display 2241). The multiple parts can show different visual indicators (e.g., different background colors) so that multiple modes, menus, options, etc. can be displayed concurrently using the different visual indicators. The display options for the player interface device 2201 can include visual indicators of status or progress of a gaming process. The display 2240 can also include a touch screen to receive user inputs.

Figure 22D:
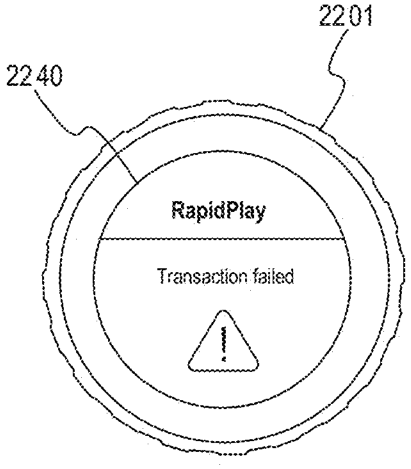
Figure 24:
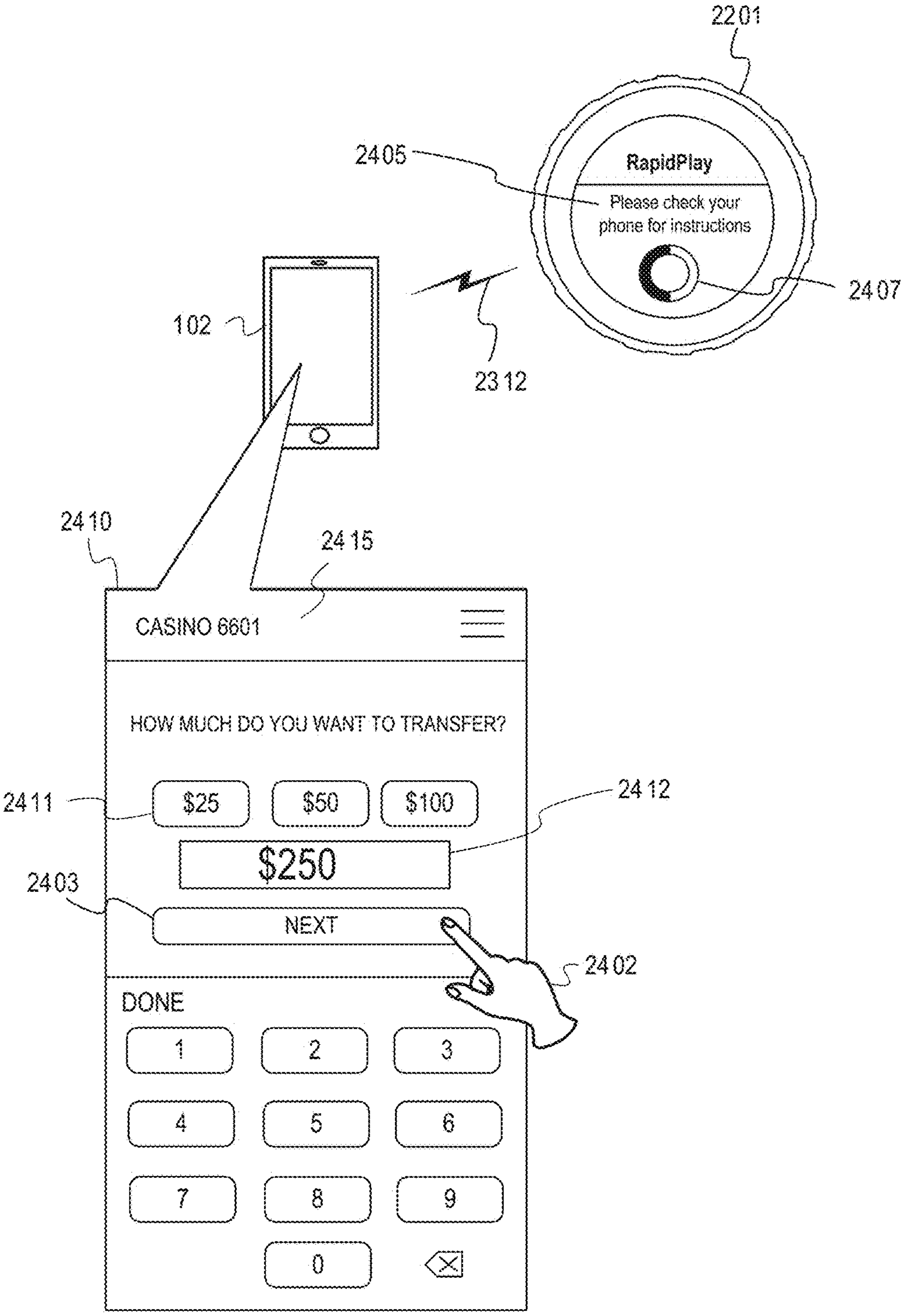

FIG. 22B illustrates an example of the player interface device 2201 after QR code 2203 has been scanned, and a microsite has been opened to request funding, via an open banking transaction (see FIG. 24 for details). FIG. 22C illustrates an example of the player interface device 2201 after funding is completed (see FIG. 25 for details). FIG. 22D illustrates an example of the player interface device 2201 if the open banking transaction fails to complete. The failure can be accompanied by an error tone.

Referring to FIG. 3, the flow 300 begins at processing block 302, where a processor generates and presents a QR Code via a player interface device (PID). In one embodiment, a QR code generator generates a new QR code periodically (refreshes the QR code) so that the QR code presented via the player interface device is different. The periodic refreshing of the QR code is a security measure so that QR code data is not reusable. FIG. 16A, for example, illustrates an example QR generator 1602. In one embodiment, the QR generator 1602 is accessible via the merchant system 150. The player interface device 106 (or player interface device 2201) requests the QR code via an API call to the QR generator 1602. The QR code includes QR code data such as a unique QR Code identifier (e.g., QR_ID) as well as information related to an image location of the QR code (e.g., an IP address for the player interface device 106 and/or information associated with player interface device 2201). In one embodiment, the QR code data also includes a URL to the microsite. In another embodiment, the QR code is for scan via mobile device of a gaming table participant, which QR code includes information related to the microsite (e.g., microsite URL) as well as gaming-table asset information (e.g., gaming table ID and player station ID) and may include other information (e.g., QR ID, casino ID, asset IP, etc.).

Referring again to FIG. 3, the flow 300 continues at processing block 304, where a processor launches the microsite via the user computing device in response to scanning the QR code. In one embodiment, the microsite is specific to a single casino and can be branded for the casino. In one embodiment, the microsite is hosted by a demilitarized zone (DMZ) network (also referred to as a perimeter network or screened subnet). In other embodiments, the microsite is hosted in the cloud (e.g., by a web server external to a casino network 118, such as the microsite server 140). In another embodiment, the merchant system 150 serves multiple casinos and/or locations that use a central anonymous cashless installation (e.g., each location connects to the same back-end service).

In one example, the user computing device 102 scans the QR code (e.g., see operation 402 in FIG. 4) via a scanning device (e.g., via an image sensor or camera of the user computing device 102). The scanning of the QR codes determines (e.g., decodes a portion of the QR code data associated with the URL for the microsite) and launches (e.g., via operation 404) the microsite via a browser application of the user computing device 102. The microsite server 140 decodes the QR code data, which includes the QR code identifier ("QR_ID"), a casino identifier ("Casino_ID"), and an IP address of the player interface device 106 ("Asset_IP"). If a player card is entered into the player interface device 106 (or player has an open rating in a CMS associated to the table position of the player interface device 2201) the QR code data also includes an account or profile identifier (e.g., "Account_No") for the player account. In one example, the QR code (e.g., QR code 2303) includes table asset information, such as an identifier of the gaming table 280 and/or an identifier associated with a gaming position at the gaming table 280.

Figure 6:
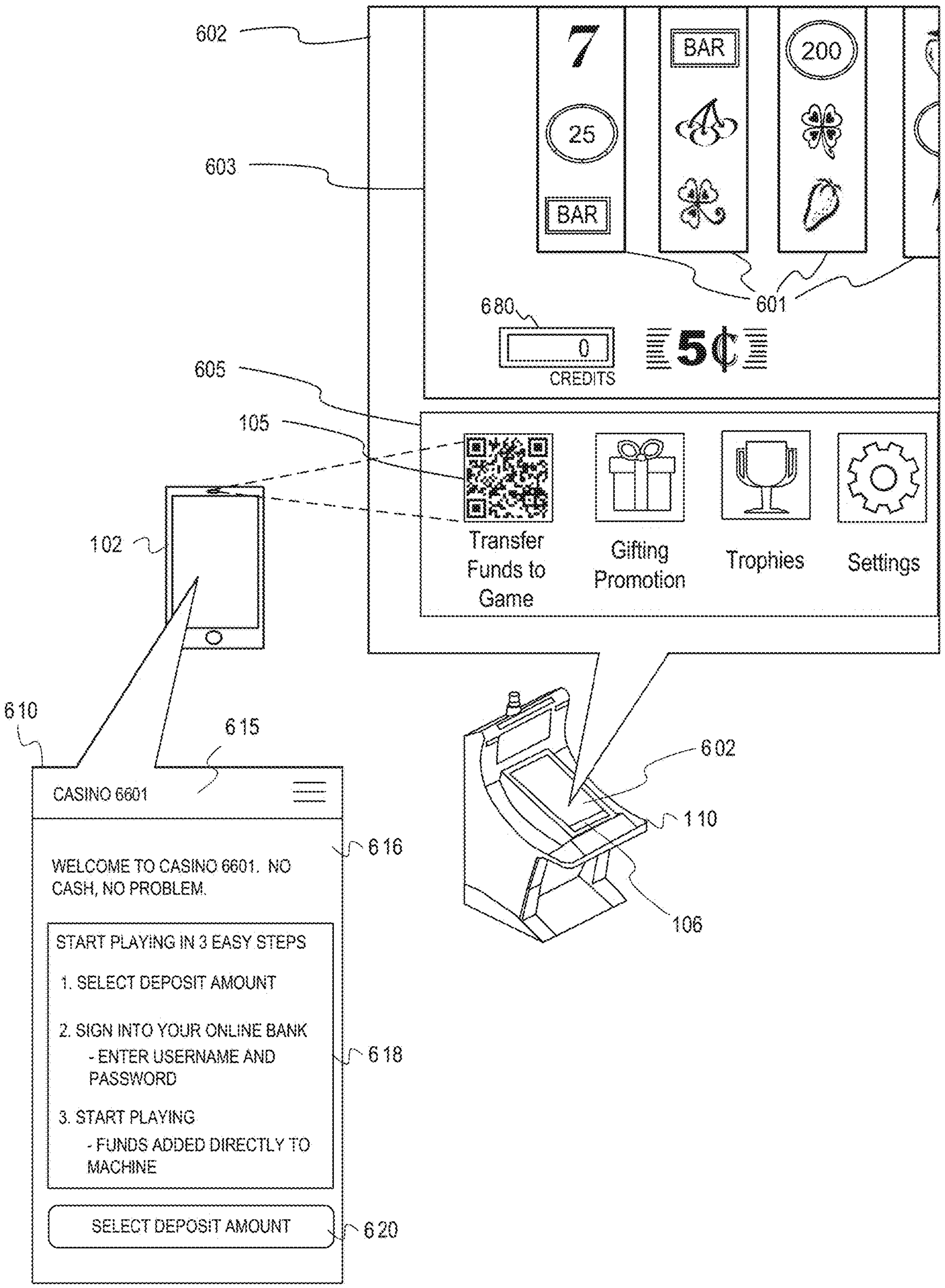
FIGS. 6, 7A, 7B, 8A, 8B, 8C, 9A, 9B, 10A, 10B, 10C, 11A, 11B, 12A, 12B, 12C, 13A, 13B, 14A, 14B, 15A, 15B, 16A, 16B, 17, and 18 are illustrations of examples of managing one or more open banking transactions using anonymous token data according to one or more embodiments of the present disclosure.
Figure 7B:
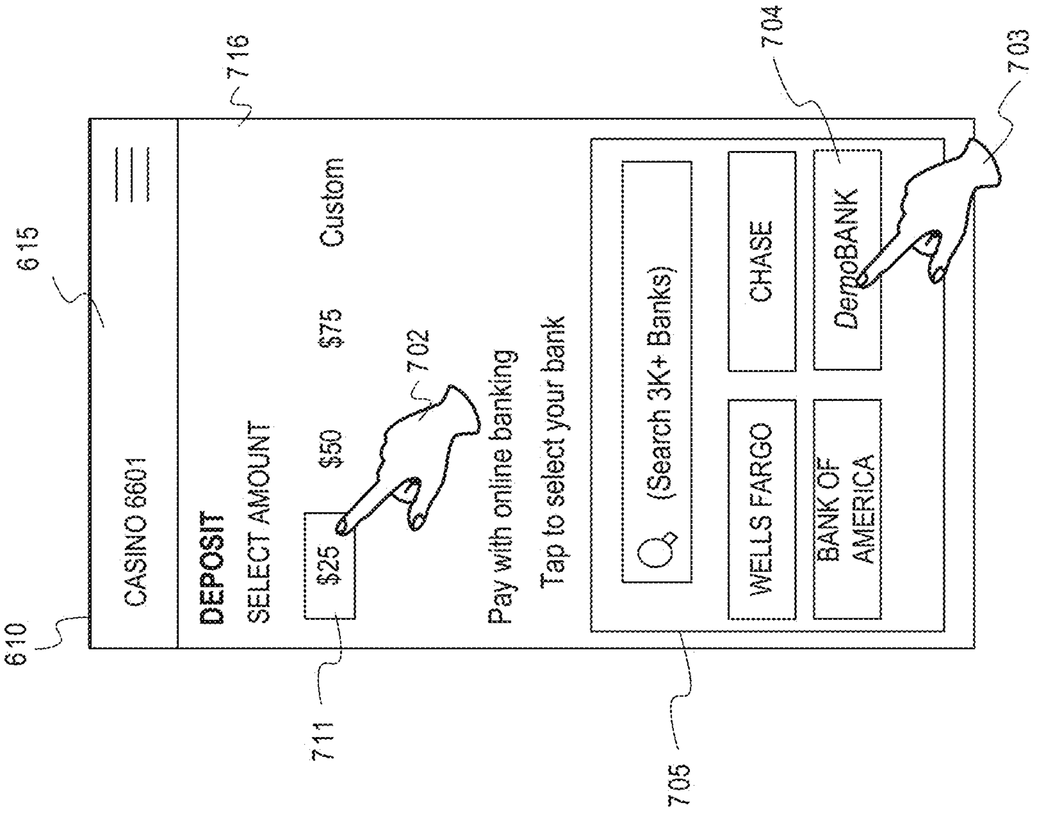
Figure 7A:
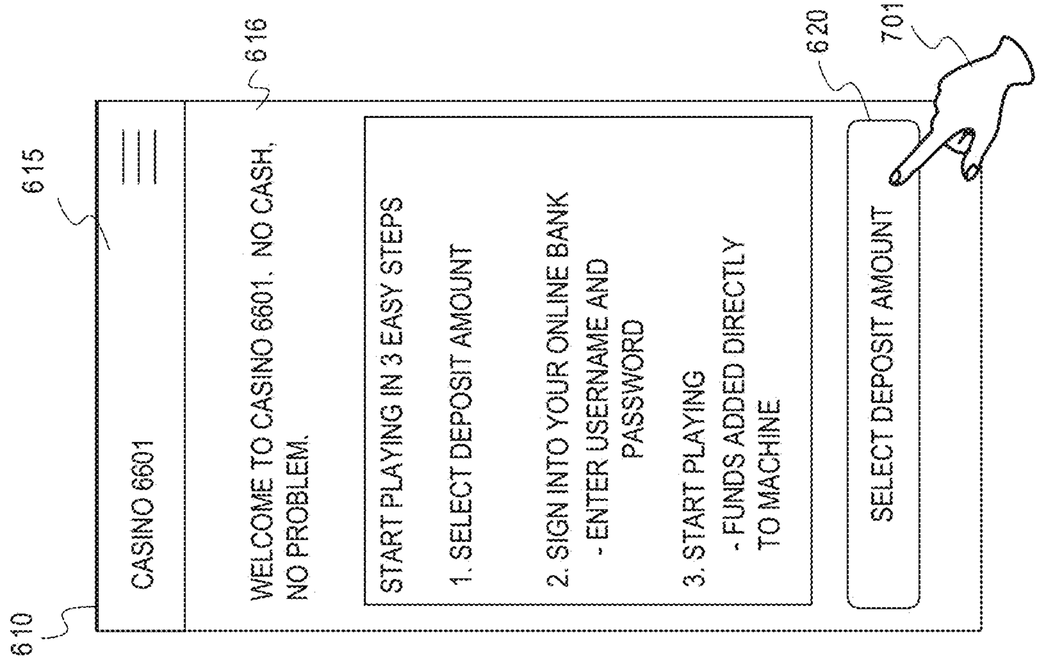

One example of launching the microsite via the user computing device 102 is illustrated in FIG. 6, where gaming machine 110 presents, via a display 602, gaming content 603 (e.g., slot reels 601) for a wagering game. The gaming content 603 includes credit meter 680. The gaming machine 110 also presents system-based content 605 associated with player interface device 106, including the QR code 105 generated uniquely for the player interface device 106. In response to scanning QR code 105, user computing device 102 launches, via browser 610, the microsite. The microsite first presents a merchant-client user interface (merchant UI 615) managed by the merchant client 242. The merchant UI 615 presents content controlled by the merchant system 150. In FIG. 6, the microsite presents, via the merchant UI 615, a screen 616 that includes instructions 618 for a user to follow regarding a request to transfer funds from an online banking payment instrument (e.g., a personal bank account). The screen 616 also includes a button control 620. As shown in FIG. 7A, a user input 701 selects the button control 620. Further, as shown in FIG. 7B, in response to detecting selection of the button control 620, the browser 610 presents, via the merchant-client UI 615, screen 716, which includes one or more user input controls 711 to specify a certain amount for the requested funds transfer. Referring momentarily to FIG. 4, in response to selection of the button control 620, the microsite server 140 initiates (via operation 406) the request (from the merchant system 150) for the open banking verification. Furthermore, the microsite server 140 calls the merchant system 150 with information provided from the QR code data (e.g., the QR_ID, Casino_ID, Asset_IP and, optionally, Account_No (if available)). The microsite server 140 also adds a device identifier (Device_ID) associated with the user computing device 102 (e.g., device information about a mobile device obtained at the browser level). After operation 406, the merchant system 150 locks (e.g., via operation 408) the player interface device 106 for the remainder of the flow 400. The player interface device 106 responds (e.g., via operation 410) with a lock success message. The merchant system 150 (e.g., via operation 412) initiates a response which, as shown in FIG. 7B, presents in the microsite (e.g., via operation 414) of amount selection options and bank options. The amount selection options present user input controls, such as control 711. User input 702 selects control 711 to specify (e.g., see operation 416) a requested transfer amount (e.g., "$25").

Figure 23:
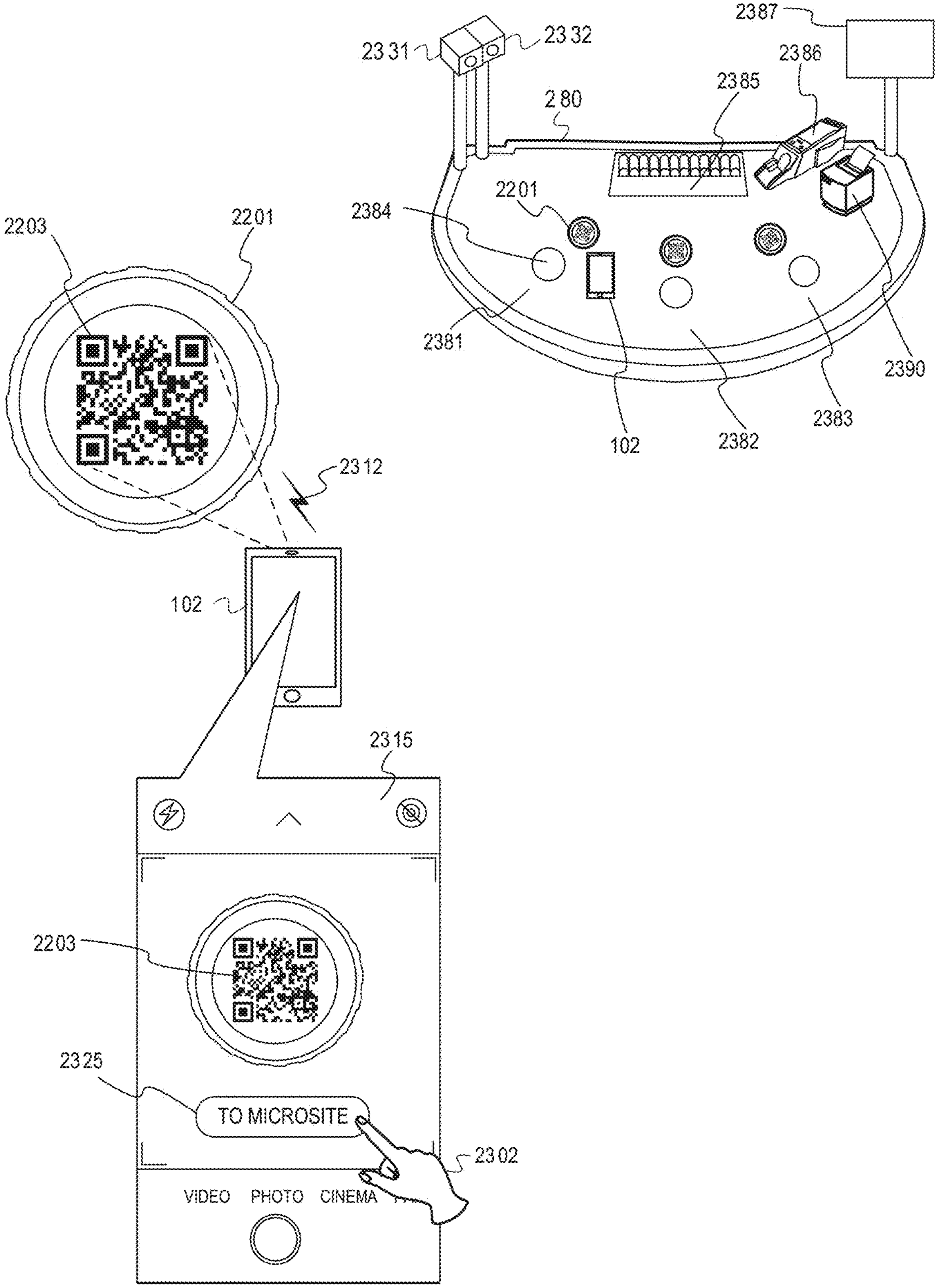
FIGS. 23, 24, and 25 are illustrations of examples of managing one or more open banking transactions associated with a gaming table according to one or more embodiments of the present disclosure.

Another example of launching the microsite via the user computing device 102 is illustrated in FIG. 23. Referring to FIG. 23, gaming table 280 includes several player gaming positions 2381, 2382, and 2383 where player participants can be seated. In one embodiment, each player gaming position 2381, 2382, and 2383 includes one or more bet spots (e.g., printed bet spots 2384) where a player can place chips for betting on a wagering game conducted at the gaming table 280. Chips can be dispensed to the player from a chip tray 2385 positioned at a dealer station. Other devices (e.g., a shuffler 2386, a printer 2390, a camera 2331, a projector 2332, a display 2387, etc.) can be associated with (e.g., incorporated into, attached to, communicatively coupled with, etc.) the gaming table 280 to capture and/or convey activities, content, information, etc. and communicate with a CMS. A separate player interface device 2201 is incorporated into the gaming table 280 at each individual player gaming position 2381, 2382, and 2383. Each player interface device 2201 is configured to communicate with a user computing device 102 (e.g., via NFC communications 2312) and/or with any other objects and/or devices at the gaming table 208 that include electronic components. The user computing device 102 runs a camera application 2315 by which a player can scan QR code 2203. The QR code 2203 includes information related to the microsite (e.g., microsite URL for microsite 2415) as well as gaming-table asset information (e.g., gaming table ID for gaming table 280 and player station ID for player gaming position 2381) and may include other information (e.g., QR ID, casino ID, asset IP, etc.). The open banking transaction is initiated in response to user input via the mobile application and based, at least, on the gaming-table asset information. A link 2325 appears in response to scanning QR code 2203. Player input 2302 launches the microsite 2415 (as shown in FIG. 24).

Figure 25:
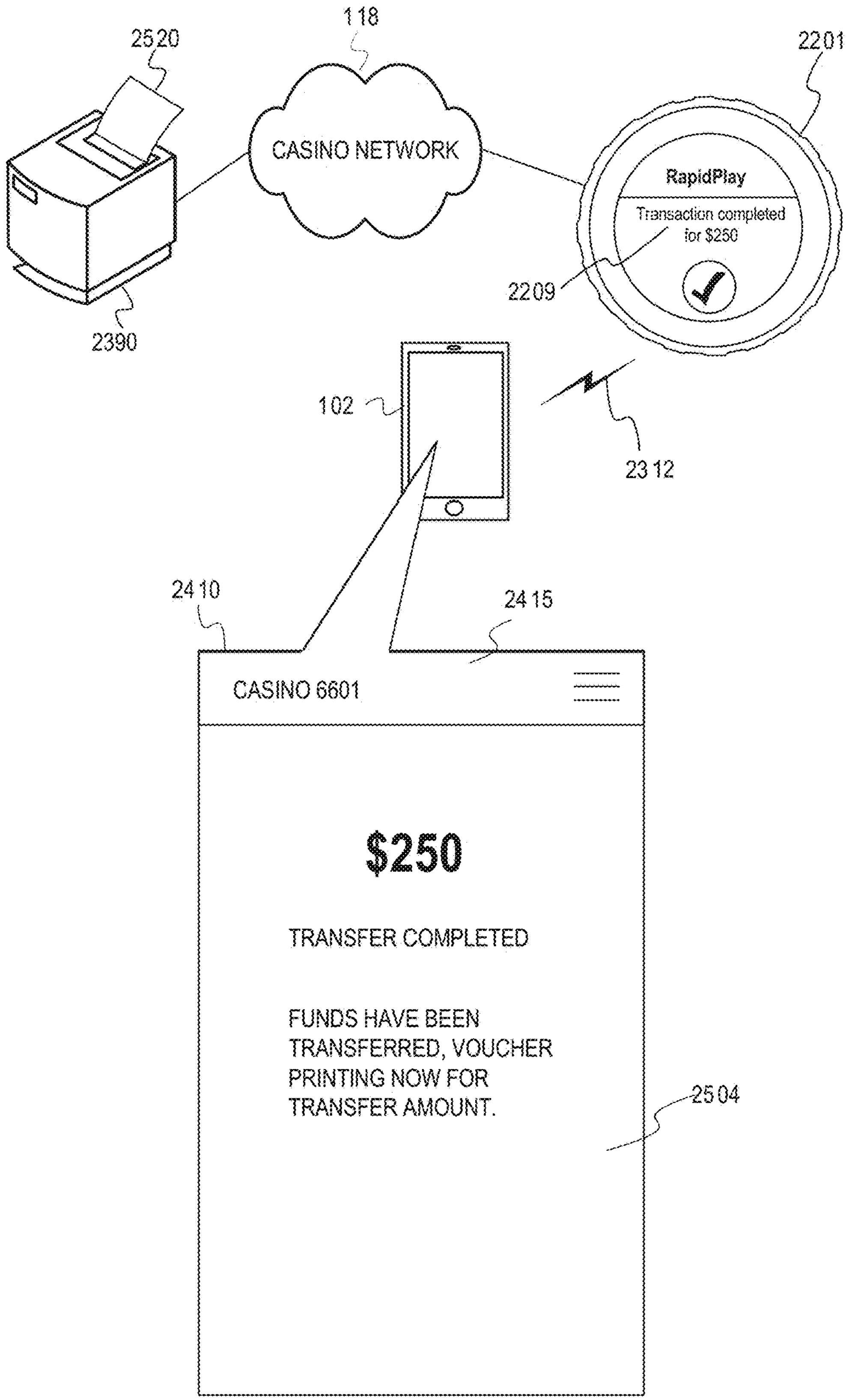

Referring now to FIG. 24, the user computing device 102 launches, via browser 610, the microsite 2415. After the microsite 2415 is launched, the player interface device 2201 presents a message 2405 indicating to check the user computing device 102 for additional instructions. The message 2405 can include a timer mechanism or graphic indicating a status of the open banking transaction. The player interface device 2201 can communicate information with the user computing device 102 via NFC communication 2312 and/or the merchant system 150 can communicate information to the mobile application via other network communication to the microsite 2415. The microsite 2415 presents instructions for a user to follow regarding a request to transfer funds from an online banking payment instrument (e.g., a personal bank account). The browser 2410 (similar to browser 610) presents one or more user input controls 2411 and/or an input field 2412 to specify a certain amount for the requested funds transfer (e.g., a "$250" debit request amount is entered into field 2412). In response to user input 2402 (e.g., via selection of control 2403), the microsite server 140 initiates (e.g., via operation 406) the request (from the merchant system 150) for the open banking verification. Furthermore, the microsite server 140 calls the merchant system 150 with information provided from the QR code data (e.g., QR_ID, Casino_ID, Table ID, Player Station ID, etc.). The microsite server 140 also adds a device identifier (Device_ID) associated with the user computing device 102 (e.g., device information about a mobile device obtained at the browser level). After operation 406, the merchant system 150 can lock (e.g., via operation 408) use of the player interface device 2201 for the remainder of the flow 400 (other than for displaying status messages). The merchant system 150 (e.g., via operation 412) initiates a response which (similar to UI module 705 in FIG. 7B) presents the bank options from which a user can search for and select a bank identifier, which (e.g., via operation 416) chooses the bank and then redirects to the PSP for open banking verification. Similar operations described in processing blocks 306 through 326 then occur (e.g., operations 418 through 464 occur). FIG. 25 illustrates an example of the microsite 2415 displaying in the browser 2410 (e.g., at processing block 464) that the transfer of the requested debit amount (from the bank account to the merchant wallet account) is completed.

Figure 12A:
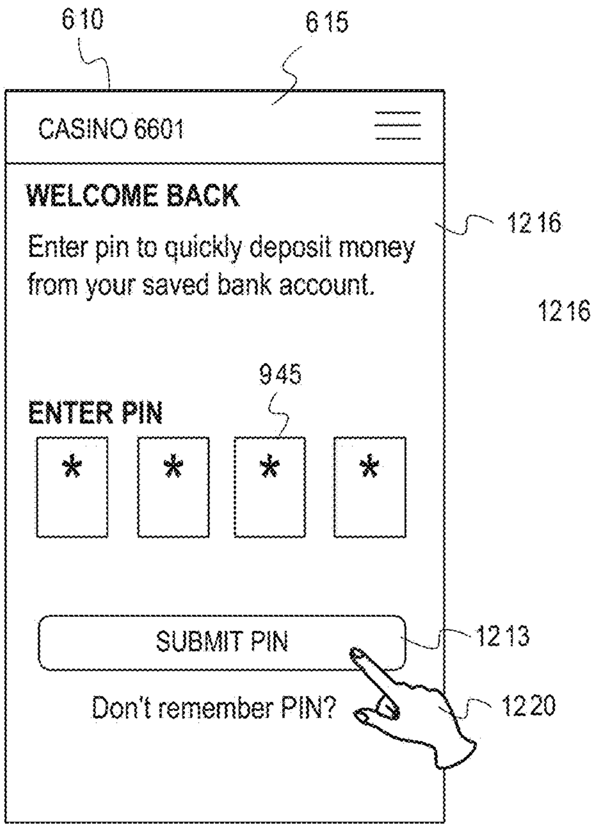
Figure 12B:
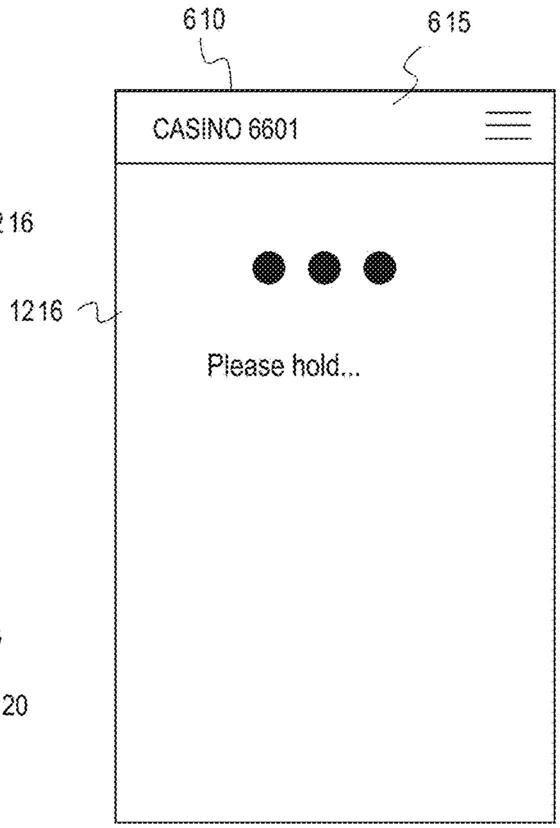
Figure 12C:
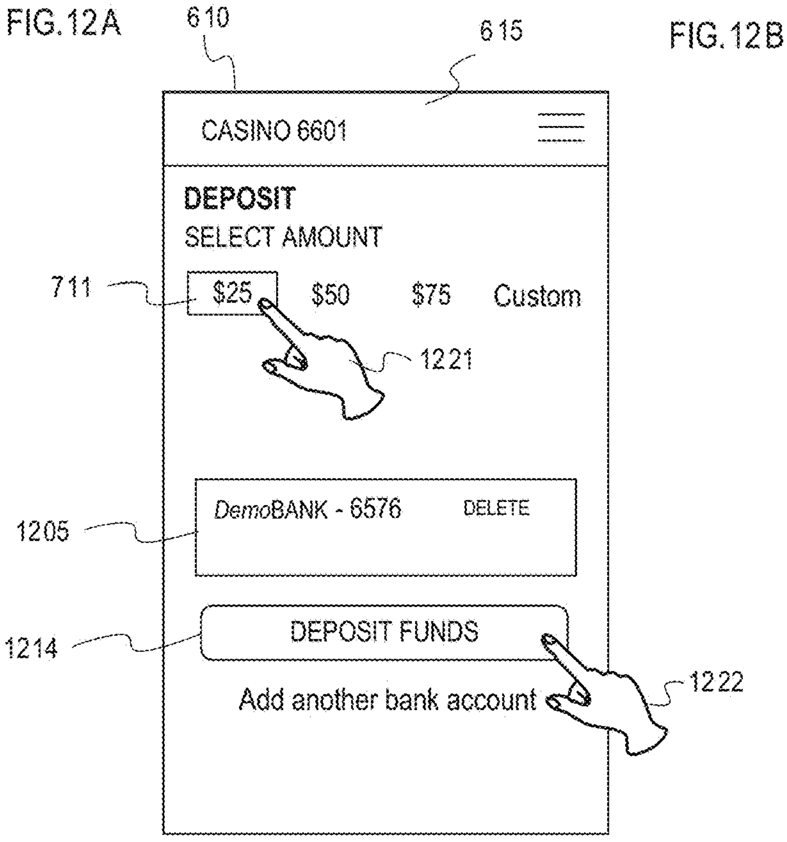

Referring to FIG. 3, the flow 300 continues at processing block 306, where a processor determines whether a stored Personal Identifier Number (PIN) is used. For example, the PIN may have been stored via a previous use of the microsite to process an open banking transaction to fund a gaming activity (i.e., the PIN would have been stored previously via performance of processing block 314 during occurrence of a prior instance of the flow 300). The storage of the PIN is described in more detail in connection with processing block 314. If, at processing block 306, the processor determines use of a stored PIN, the flow 300 continues at processing block 310, where a processor accesses stored user credentials for the PSP system 170 to authenticate access to the previously authorized payment instrument (e.g., authenticated via performance of processing block 312 during occurrence of a prior instance of flow 300). FIG. 12A illustrates an example of the browser 610 which presents the merchant-client UI 615 and a screen 1216 with user input controls 945 in which a user can enter a previously created PIN value. The user selects (via user input 1220) button 1213, which submits the entered PIN. As shown in FIG. 12B, in response to selection of button 1213, screen 1216 presents a hold message while the merchant system 150 accesses the stored credentials associated with the PIN and submits them to the PSP system 170. Furthermore, after the stored credentials are submitted, as shown in FIG. 12C, the browser 610 presents the amount selection options (e.g., control 711) which can be selected via additional user input 1221. Furthermore, the merchant-client UI 615 presents a UI module 1205 (of a library of the PSP system 170) as an overlay window or widget that displays a link to the previously selected online banking payment instrument.

Figures 8A, 8B, 8C:
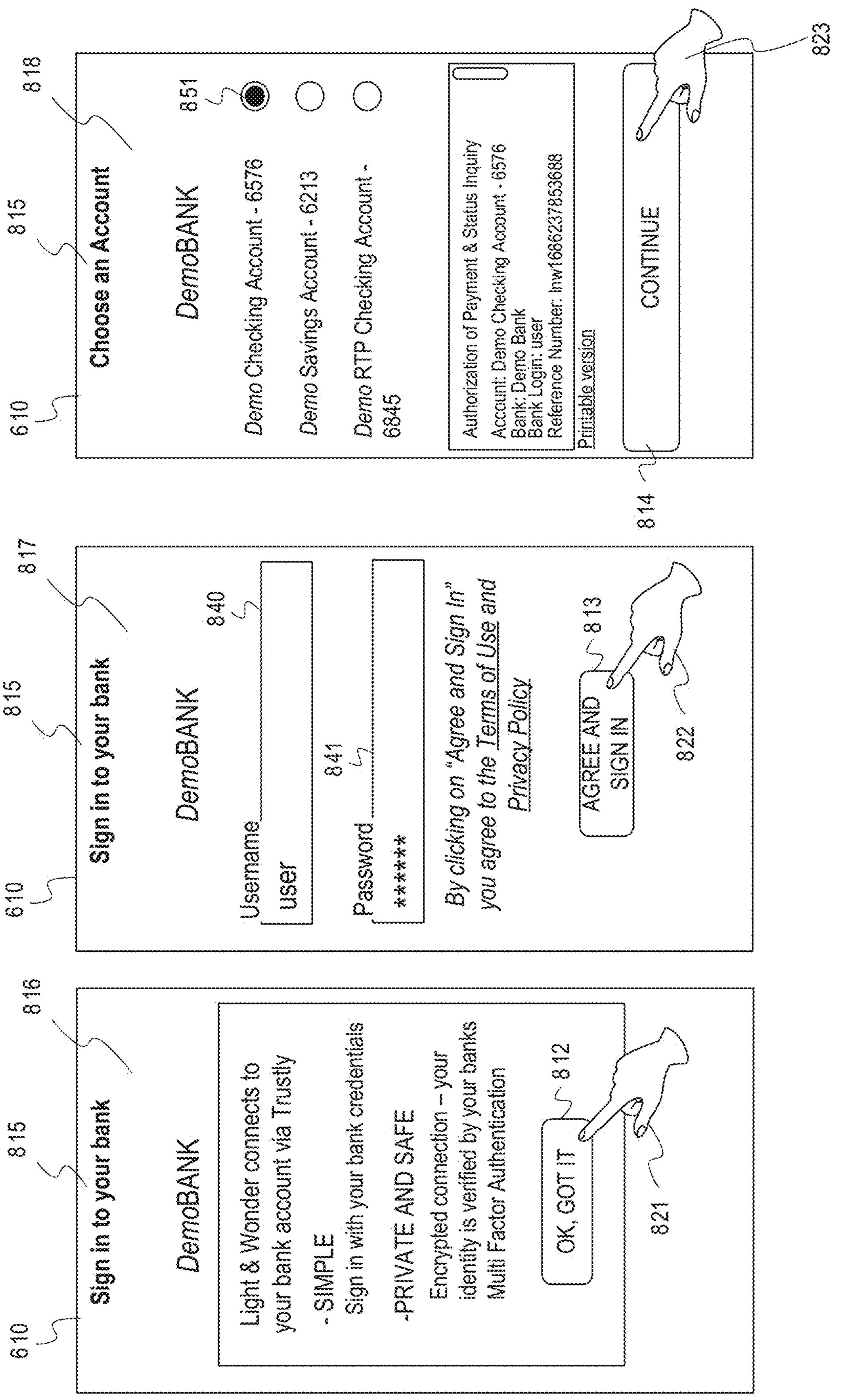

Referring back to FIG. 3, if, at processing block 306, the processor does not determine use of a stored PIN, the flow 300 continues at processing block 308 where a processor requests user credentials for the PSP system 170 to authenticate access to an online banking payment instrument (e.g., a personal bank account). For example, as shown in FIG. 7B, the screen 716 presents a UI module 705 that presents the bank options from which a user can search for and select a bank identifier (e.g., control 704 associated with fictitious bank "DemoBANK"). A user input 703 selects the control 704 (e.g., the user computing device 102 performs operation 416 to choose the bank). In one embodiment, the UI module 705 is presented in response to an API call to access a JavaScript library of the PSP system 170. In some examples, the UI module 705 is a lightbox (e.g., a window overlay on the microsite webpage) and/or a widget provided by the PSP system 170 to overlay a portion of the content presented via the merchant-client UI 615 with PSP functionality to search for, and/or select the bank. The microsite server 150 then redirects (e.g., via operation 418) the open banking transfer request to the PSP system 170. After the transfer request is transmitted to the PSP system 170, the PSP system 170 presents (e.g., via operation 420) one or more bank authorization screens. For example, as shown in FIG. 8A, the PSP client 241 presents, via the browser 610, a PSP-client UI 815 controlled by the PSP system 170. PSP-client UI 815 presents screen 816 which specifies information related to the PSP-client UI 815. A user input 821 selects input control 812 to acknowledge the presented information. As shown in FIG. 8B, the PSP-client UI 815 then presents a bank login screen 817 which includes user input controls 840 and 841 related to a username and password credentials. The user inputs the credentials into the controls 840 and 841 and, via user input 822, selects button 813 which submits (e.g., via operation 422) the credentials to the PSP system 170 to authenticate the bank access. Furthermore, as shown in FIG. 8C, the PSP-client UI 814 presents options to select from one or more bank accounts associated with the bank (e.g., radio button 851 to select a checking account, a savings account, or a real-time payments (RTP) account of the user).

Referring again to FIG. 3, the flow 300 continues at processing block 312, where a processor authenticates, via an open banking verification, access to the online banking payment instrument. For example, as shown in FIG. 8C, a user selects, via user input 823, button 814 to continue with the verification by the bank. The PSP system 170 then facilitates verification with the bank (e.g., via operation 424) using the credentials and the selection of the bank account.

Figure 9A:
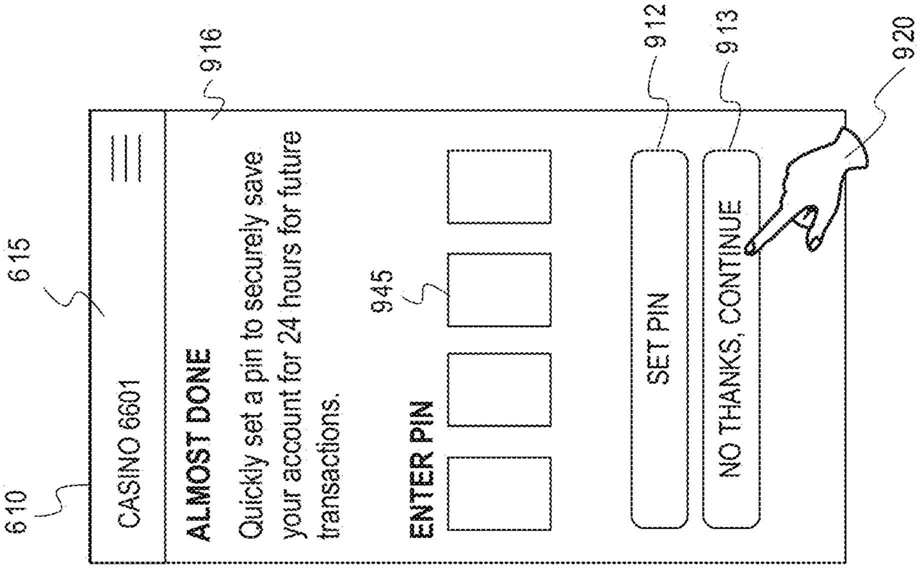
Figure 9B:
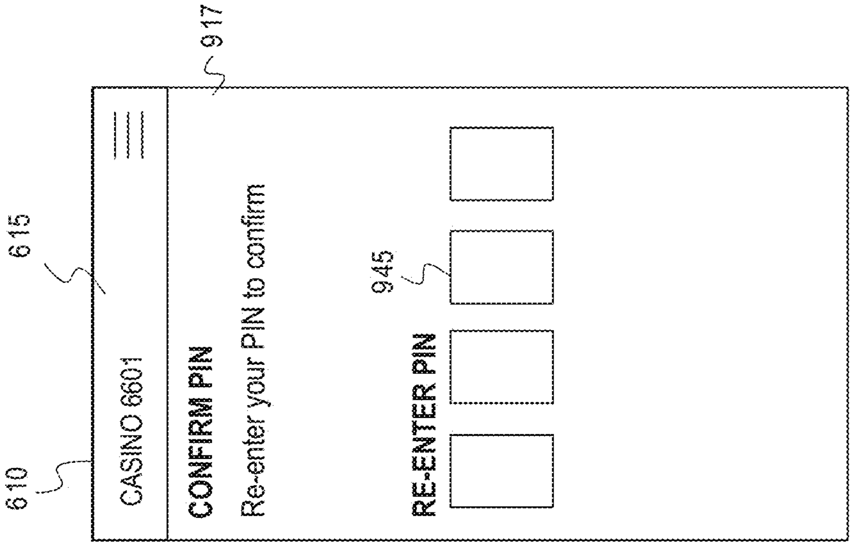
Figure 10A:
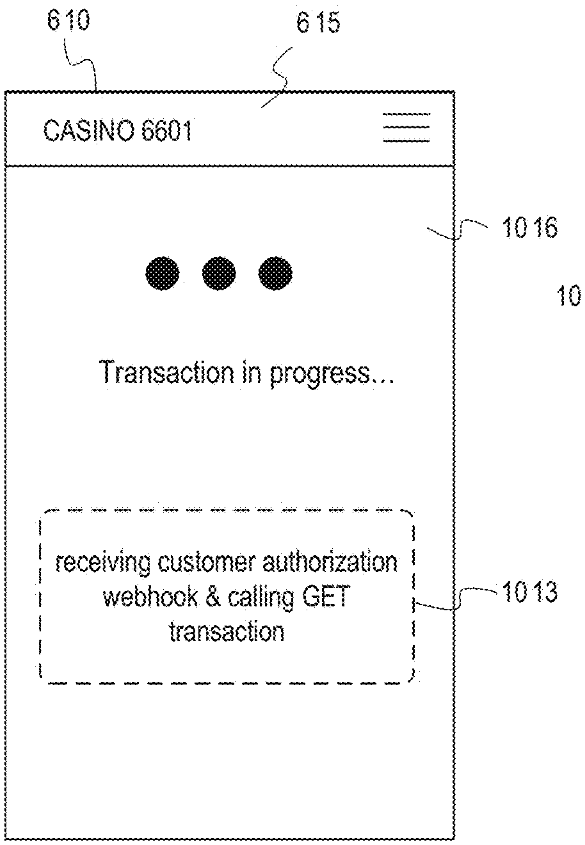
Figure 10B:
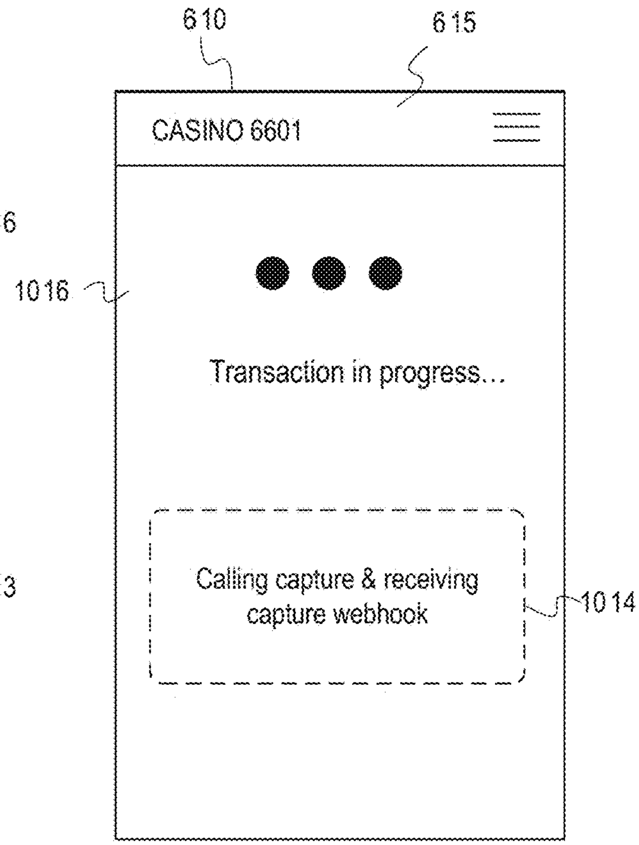
Figure 10C:
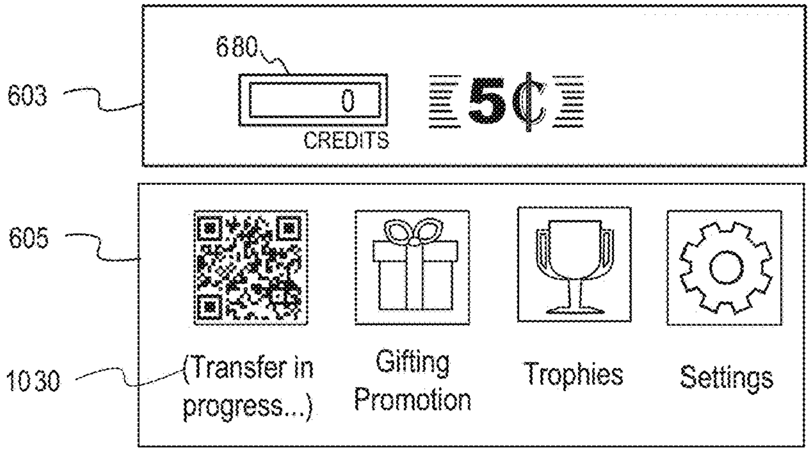

Referring again to FIG. 3, the flow 300 continues at processing block 314, where a processor determines whether an option is selected or used to store or edit a PIN (e.g., the PIN described at processing block 306). If, at processing block 314, the processor determines selection of the option to store or edit of the PIN, the flow 300 continues at processing block 316, where a processor stores or edits the PIN value in association with the microsite. FIG. 9A illustrates an example of the browser 610 presenting, via merchant-client UI 615, screen 916 to enter (using input controls 945) a PIN value. A button 912 is selectable to set the PIN. If the button 912 is selected, the browser 610 presents (as shown in FIG. 9B) screen 917 to confirm the PIN value. If button 913 is selected, the PIN storage and/or editing is bypassed. For the example shown in the flow 400, no PIN value is stored.

Referring again to FIG. 3, if, at processing block 314, the processor does not detect that an option is selected to store or edit the PIN, the flow 300 continues at processing block 318, where a processor initiates, in response to the authentication, a long-lived, open banking transaction via a webhook between the merchant system and the PSP system. For example, in response to completion of the open banking verification, a webhook is established (e.g., via operation 428) between PSP system 170 and merchant system 150. A webhook is an HTTP-based callback function that allows lightweight, event-driven communication between two application programming interfaces (APIs) (e.g., certain events that occur via the merchant system 150 are automatically reported to the PSP system 170 for an automated response). In one embodiment, the webhook facilitates communications between the merchant system 150 and the PSP system 170 by pushing data to the PSP system 170, when an event occurs or a change happens, instead of requiring the PSP system 170 to poll the merchant system 150 for data. In one embodiment, the split token involves a key-value pair where the key involves the transaction identifier (Trans_ID) and the value is split token data. In one example, a token service, via an API gateway of the PSP system, generates the split token. For instance, upon a user authorization of a banking provider for use with the PSP's payments APIs, the data retrieved from the authorization is encoded and split bit-for-bit. The client receives half of the token and the PSP system 170 persists the other half. When the token service is issued for the client, it splits the token into two parts: (1) the signature of the token and (2) the head and body of the token. From there, the token service sends back the signature half to the client while the token service hashes the signature part and sends the hash with the second half (the head and body) to the API gateway. The API gateway then caches the token using the hashed signature as the key for the cache. The value is cached for as long as an expiration time of the token (e.g., 24-hour timeout). When the client sends a request, the API gateway takes the signature part sent by the client, hashes it and looks it up in its cache. Then it can glue back the token—the head, body and signature, and forwards it to any API service handling the request. Thus, the API gets a whole token, ready to be deserialized and used as needed. The split token is provided immediately after being generated, via the webhook (e.g., via a transaction authorization event), to the URL of to the microsite. A webhook listener is configured at that URL to persist the split token along with the correlating transaction identifier (Trans_ID). By persisting the split token (e.g., via a persisted cache), the transaction will not need to be re-verified, and the authorization flow (e.g., via the UI module 705, via a lightbox, etc.) can be reused (until the split token expires) without needing to repeat a portion of flow 300 again (e.g., without having to perform processing block 308, but instead performs processing block 310). The PSP system 170 redirects (e.g., via operation 426) the transaction back to microsite server 140 (using at least portion of transaction data (e.g., Trans_ID) associated with the split token).

Referring again to FIG. 3, the flow 300 continues at processing block 320, where a processor submits, via the microsite, the debit request and receives, from PSP system 170 anonymous token data for the long-lived transaction. For instance, after the PSP system 170 redirects (via operation 426) the transaction back to the microsite server 140 the merchant client 242 detects submission of the debit request to electronically process the requested amount (e.g., via user input 823 shown in FIG. 8C and/or user input 920 shown in FIG. 9A). The microsite server 140 (e.g., via operation 430) communicates, via the merchant client 242 with the merchant system 150 in response to detection of submission of the debit request, an encrypted secret key (Secret) generated based on at least a portion of the transaction data and previously detected device data (e.g., Secret is an encrypted version of the Trans_ID and the Device ID (i.e., Secret=Encrypt(Trans_ID, Device_ID)). The merchant system 150 verifies, (e.g., using the Secret) the debit request and forwards the debit request to PSP system 170 (e.g., performs GET transaction/API call at operation 432 shown in FIG. 5) using transaction data (e.g., using Trans_ID and split token). The PSP system 170 receives the forwarded debit request (verified based on the provided transaction data), and generates (e.g., at operation 434) anonymous token data (e.g., an anonymous token used to identify a use of online banking payment instrument, such as the bank account, via the microsite). The anonymous token data includes an anonymous token (also referred to herein as a “wagering instrument number” or “WI_No”). The anonymous token identifies use of an online banking payment instrument (e.g., to make cashless transactions, such as via a bank account) with a token value (substitute value) in place of any sensitive information (e.g., in place of an actual online banking payment instrument identifier). Online banking payment instrument data is stored by the PSP system 170 and may include, but is not limited to a bank account, a savings account, a checking account, a real-time payments (RTP) account, etc. of the user. The anonymous token provided by the PSP system 170 is not the same value as the actual online banking payment instrument identifier nor does it contain sensitive information that could be used to deduce or derive the online banking payment instrument identifier nor does it contain sensitive information (e.g., credentials) used to access and/or use the online banking payment instrument. Rather, the anonymous token is a replacement value (generated and provided by the PSP system 170). In one embodiment, the PSP system 170 generates and/or provides the same token value (e.g., the same WI_No) for each transaction either made by the same online banking payment instrument used or made by other online banking payment instruments (e.g., other bank accounts) used by the same user via the microsite. In other embodiments, the PSP system 170 can associate a different token value for each different online banking payment instrument (e.g., using a different WI_No for each online banking payment instrument) depending on which was the last payment instrument used via the microsite. For example, the microsite can hold an authorization mechanism to identify with the last online banking payment instrument used. Multiple active authorizations can be performed via the microsite. Thus, the merchant system 150 can track (e.g., store in a database), the token values and transaction amounts for use of each of the online banking payment instruments accessed by the same patron via the multiple active authorizations provided via the same microsite. In one example, the PSP system 170 generates a unique token the first time an online banking payment instrument (e.g., a bank account) is used for a debit via the microsite. In one example, the PSP system 170 saves (e.g., via operation 436) the anonymous token as a unique, static value used for reference during a current open transaction as well and for use in future debit transactions via the microsite that use the online banking payment instrument, (or, in one embodiment, for any other online banking payment instrument associated with the user’s bank access to one or more bank accounts from one or more banks available for access via the PSP system 170). In one embodiment, for future debit transactions made via the microsite, the PSP system 170 can access (e.g., from database 1601 of FIG. 16) the anonymous token and re-use the same token during a debit transaction via the merchant system 150 performed by the same user. In one embodiment, the PSP system 170 returns/provides the same, previously generated and stored anonymous token for a debit that came from the microsite (e.g., for a debit made by the same user, via the microsite, according to the online banking payment instrument used). The merchant system 150 stores the anonymous token value within a transaction record in a database for each debit transaction made via the PSP system 170 using the microsite. The transaction record also includes other information about the transaction, such as an amount of the debit/payment made during the transaction (i.e., the debited amount) and a date/time for each transaction. The transaction record also includes all other data associated with the transaction, including any profile and/or account identifiers used to associate the transaction with a player profile or account within casino system 130 (e.g., a player/account identifier used with a CMS, such as CMS 1790 shown in FIG. 17).

The merchant system 150 stores a collection of records, one for each debit transaction made by the player via the merchant system 150. FIG. 17 illustrates an example of the PSP system 170 that stores (e.g., in a database table 1710 of database 1701) an actual identifier value 1705 for a payment instrument (e.g., for a bank account number). The merchant system 150 includes (or is connected separately with) a CMS system 1790 which stores, in database 1791, player tracking identifier 1712 associated with a player profile or account. The merchant system 150 further stores, in database 1702, the records associated with cashless debit transactions that have occurred. For example, the database 1702 includes a data table 1730 that specifies a first column 1731 for a player tracking identifier 1712, a second column 1732 for a debited/transacted amount 1732, a third column 1733 for the transaction identifier value 1755, a fourth column 1734 for the anonymous token value 1707, and a fifth column 1736 associated with a date/time that the transaction occurred for the record 1715. In an example where the user that requests the debit transaction is logged into a player account (e.g., has entered a player account card into the player interface device 106, has logged into a player account via the player interface device 106, or has an open player rating in a CMS associated to the table position of the player interface device 2201, etc.), the merchant system 150 can assign the tracking identifier 1712 for the player account. In an example where the user that requests the debit transaction is not logged into a player account (e.g., has not entered a player account card into the player interface device 106, has not logged into a player account via the player interface device 106, etc.), the merchant system 150 can leave blank the value associated with the tracking identifier column 1731. In another embodiment, the merchant system 150 can search the records for any other transactions that occurred via the microsite that have a similar anonymous token value 1707 listed in column 1734, which indicates that the transactions are related to a use of a set of one or more bank accounts accessible to a same user via the microsite.

In some embodiments, the PSP system 170 can provide, to the merchant system 150, the same token associated with all online banking payment instruments used via the PSP system 170 by the same user. For example, even if the user accesses, via the HTTP session on the microsite, a different online banking payment instrument for a subsequent debit request (e.g., via a second bank account accessible via the PSP system 170, etc.), the PSP system 170 can detect which online banking payment instruments are used for the given microsite session (accessed by the user) and can determine that two different online banking payment instruments (e.g., a first bank account from a first bank, a second bank account for a second bank), are associated with the same user (e.g., via the same microsite session). For example, the PSP system 170 can store (e.g., in database 1701) all of the online banking payment instruments authenticated and/or used by the user via the microsite. In one embodiment, the PSP system 170 stores the actual identification numbers for the different online banking payment instruments used via the same microsite URL and links them to one or more anonymous tokens, which the PSP system 170 provides to the merchant system 150 during any transactions using any of the linked online banking payment instruments. In one embodiment, the PSP system 170 stores the actual identification numbers for different online banking payment instruments used via the same microsite URL (e.g., see FIG. 8C showing different bank accounts, including "Demo Checking Account-6576," "Demo Savings Account 6213," and "Demo RTP Checking Account 6845") and links them to different anonymous tokens (e.g., to a different WI_No for each separate online banking payment instrument accessed), which tokens the PSP system 170 provides to the merchant system 150 during any of the multiple active transactions, made via the microsite, using any of the linked online banking payment instruments.

Referring again to FIG. 3, the flow 300 continues at processing block 322, where a processor determines whether a limit is being exceeded by the current transaction. Limits may be imposed by the player (e.g., the player selects personal limits to the amount of debits that can occur within a given period or can occur for each individual transaction). For instance, as shown in FIG. 15A, the browser 610 presents, via merchant-client UI 615 at the microsite, an option 1513 to set personal limits. Upon selection of the option 1513 (e.g., via user input 1520), the browser 610 presents, as shown in FIG. 15B, a screen 1516 showing additional options (e.g., input controls 1541 and 1542) to enter specific limit values for different types of time periods. The limits can be set by selection (via user input 1521) of button 1514. In another example, limits may be imposed by entities involved in, and responsible for, the transaction, such as regulatory debit limits imposed by a casino, a jurisdiction, etc. on the amount of financial debits a player or individual is allowed to, or is recommended to, maintain within a given range (e.g., a time-based limit, an average limit, an overall debit limit, etc.).

In one example, as shown in FIG. 18, the merchant system 150 analyzes transaction records (e.g., records 1816, 1715, and 1714) associated with the same anonymous token value 1707 listed in the table 1730. Record 1816 is associated with a current long-lived transaction (e.g., for transaction identifier 1826 for a requested debit amount of $25). Record 1816 is not finalized as the current transaction is not complete (pending approval of the limit check), however the merchant system 150 can store a temporary value for the debit value 1820 and/or a temporary value for a date/time of the current transaction The current transaction is for an anonymous (e.g., non-carded) player, thus the tracking identifier field in record 1816 is left blank. Based on consistent data stored in each of the records (e.g., the anonymous token 1707 which specifies all transactions made by the user via the microsite connection to the PSP system 170), the merchant system 150 can attribute the current debit request to a particular individual associated with either the profile/account identifier 1712 and/or the anonymous token 1707. The merchant system 150 aggregates (sums) the debit amount totals (e.g., in column 1732) for all records that show the same anonymous token value (in column 1734) within a given date range associated with the limit. The merchant system 150 determines a time range (e.g., a time period) associated with the limit and, thus, limits aggregation to only a record set 1887 whose time stamp data (e.g., under column header 1735) falls within the time range. For example, the merchant system 150 detects that a daily debit limit 1814 (e.g., $200) is specified in associated with a user (associated with tracking identifier 1712). The merchant system 150 can automatically check, prior to authorizing a payment, whether the total aggregated value 1822 of the debits in the record set 1887 (e.g., past debit value 1818 for $100 and currently requested debit value 1820 for $25) exceeds the daily debit limit 1814. The merchant system 150 can, further, animate a message 1823, via a display screen (e.g., of the player interface device 106, of the player interface device 2201, of a mobile device, etc.), which message 1823 indicates whether the currently open transaction, if completed, would cause the total aggregated debit value 1822 to exceed the limit 1814.

Referring momentarily back to FIG. 3, if at processing block 322, the processor determines that the limit is exceeded, the flow 300 continues at processing block 324 where a processor prohibits the transaction. For example, the merchant system 150 can automatically enforce limits (e.g., by cancelling a current transaction if it would exceed the limit, by automatically adjusting the requested debit amount for the current transaction, etc.). In one embodiment, the merchant system shows a warning message, indicating a limit being exceeded, via both the microsite and via player interface device 106. The warning message presented via the player interface device and/or the microsite can explain the reason(s) and/or details related to the limit being exceeded. In one embodiment, the merchant system 150 can prohibit the transaction by backing out of the transaction and/or by not sending information required to continue a transaction (e.g., the merchant system 150 can prevent sending a "Capture" transaction (e.g., at operation 450) so that the current long-lived transaction fails). Further, the merchant system 150 can send an error message to the PSP system 170 regarding termination of the transaction.

Still referring to FIG. 3, if, at processing block 322, the processor determines that no limit will be exceeded, the flow 300 continues at processing block 326, where a processor funds, via communicative connection between the PSP system, the merchant system and the player interface device, the debit request via an anonymous digital wallet account of the merchant system using the anonymous token data as a reference. For example, referring to the continuation of flow 400 illustrated in FIG. 5, during operation 436, the merchant system 150 associates the current debit request to an anonymous digital wallet account using the anonymous token data (using WI_No) as a reference. In one embodiment, the merchant system 150 can also use at least a portion of transaction data (e.g., Trans_ID) to establish a link to the anonymous digital wallet account. The merchant system 150 provides (operation 438) to the microsite server 140 (i.e., via merchant client 242), a JavaScript Object Notation (JSON) web token. The JSON web token (JWT token) includes the anonymous token data (specifying authorization of the debit). When the microsite server 140 receives the JWT token, it initiates transfer (via operation 440) of the authorized debit to the merchant system 150 for interaction with player interface device 106. At operation 442, the merchant system 150 notifies the player interface device 106 of the debit request (e.g., the merchant system 150 provides, during operation 442, reference data which includes the Trans_ID for the current transaction, the QR_ID, the WI_No, and the requested debit amount (e.g., "$25"). At this time, via operation 446, the user computing device 102 presents (via the microsite) indicators that display the transfer of funds being in progress. For example, the user computing device 102 presents one or more screens (e.g., screen 1016 shown in FIGS. 10A and 10B) to specify progress indicators 1013 and 1014. Furthermore, the player interface device presents a message (e.g., message 1030 shown in FIG. 10C) to specify that the funds transfer is in progress.

Figure 11A:
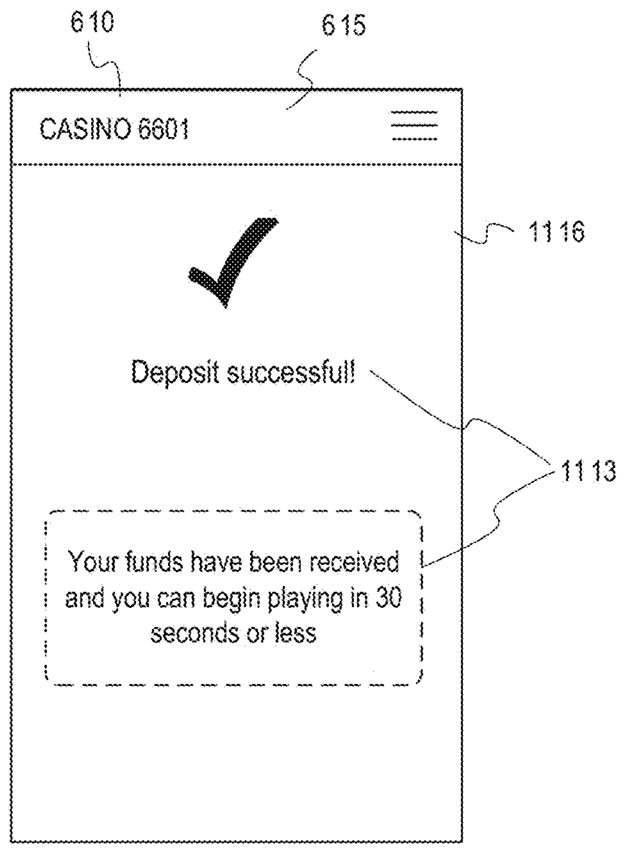
Figure 11B:
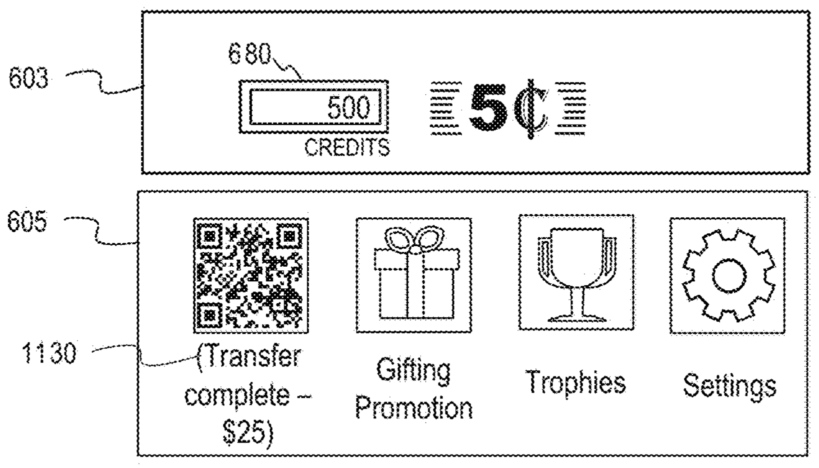

Still referring to FIG. 5, at operation 448, the player interface device 106 initiates a debit from the anonymous wallet. For example, via operation 448, the player interface device 106 calls to the anonymous digital wallet account running on the merchant system 150. The call uses reference data (e.g., WI_No and Trans_ID) and requests an electronic transfer of the requested debit amount from the anonymous digital wallet account (on merchant system 150) to the player interface device 106 associated with gaming machine 110. After receiving the call, the merchant system 150 submits (via operation 450) to the PSP system (e.g., via the webhook), a capture transaction call. The capture transaction call using reference data such as the Trans_ID, the split token, the WI_No, and the requested debit amount. In response to the capture transaction call the PSP system 170 responds (via operation 452) with an acknowledgement and (via operation 454) authorizes payment of the requested amount from the authorized online banking payment instrument (e.g., from the authorized bank account). In response to operation 454, the merchant system 150 funds the anonymous digital wallet account via an electronic funds transfer (e.g., the PSP system 170 performs an Automated Clearing House (ACH) transaction, FedNow transaction, or other similar funds transfer to transfer the funds from the PSP system 170 to the merchant system 150). Such transactions may be aggregated for a time period. At operation 456, the merchant system 150 communicates to player interface device 106 a notification of authorized payment (merchant system 150 provides merchant-related and/or casino-related tracking data to player interface device 106, such as a digital wallet transaction identifier associated with the funded anonymous digital wallet account). In response to operation 456, the player interface device 106 (via operation 458) instructs, via a communication between player interface device 106 and gaming controller 108, performance of the funds transfer via a gaming funds transfer protocol (e.g., protocol authorized by jurisdictional/regulatory gaming approval, such as advanced funds transfer (AFT) using the Slot Account System (SAS) standard). At operation 458 the player interface device 106 performs the electronic funds transfer (e.g., AFT) from the linked anonymous digital wallet account (stored by merchant system 150) to the game controller 108 (e.g., via communication between player interface device 106 and game controller 108). At operation 460 the player interface device 106 notifies the merchant system 150 to commit the debit, which the merchant system 105 performs (i.e., self commits) the completion of the transaction and deducts the requested amount from the anonymous digital wallet account. The merchant system 150 stores an indication of completion of the transaction and ensures that all data associated with the transaction is stored in the merchant system 150 for use, in subsequent debit requests, to perform limit checks for individual associated with same token, etc. Furthermore, at operation 462, the player interface device 106 indicates to the microsite server 140 that the transfer is completed. At operation 464, the user computing device displays an indicator that the transfer completed successfully. For instance, as shown in FIG. 11A, the browser 610 presents, via the merchant-client UI 615, a screen 1116 that indicates one or more messages 1113 of the successful funds transfer (i.e., completion of the debit request). Furthermore, as shown in FIG. 11B, the player interface device 106 presents, within the system-based content 605, a message 1130 indicating that the transfer of the requested debit amount is complete. Regarding the operations between the merchant system 150 and the player interface device, API calls are made, as shown in FIG. 16B, via different Hypertext Transfer Protocol (HTTP) APIs. For instance, an API call to the player interface device 106 uses HTTP API 1604. An API call to the merchant system 150 uses Hypertext Transfer Protocol Secure (HTTPS) API 1606.

In one embodiment, the player interface device 106 may fail to perform the AFT operation. If that occurs, the player interface device 106 instructs the merchant system 150 of the error. The merchant system 150 then submits (via the webhook) a call to the PSP system 170 for a refund transaction (using the Trans_ID of the failed transaction, the split token, the WI_No, and the requested debit amount). The PSP system 170 refunds the amount from the digital wallet account associated with the WI_No. Furthermore, the merchant system 150 records a void associated with the refund. The merchant system 150 then submits the void response (e.g., using the digital wallet transaction identifier associated with the Trans_ID and/or WI_No) to the player interface device 106 to process. Further, the merchant system 150 sends a notification to the microsite server 140, so that the microsite can present (e.g., via merchant-client UI 615) a screen that indicates the deposit failure along with a description of the reasons for the failure (e.g., a machine error).

Figure 21:
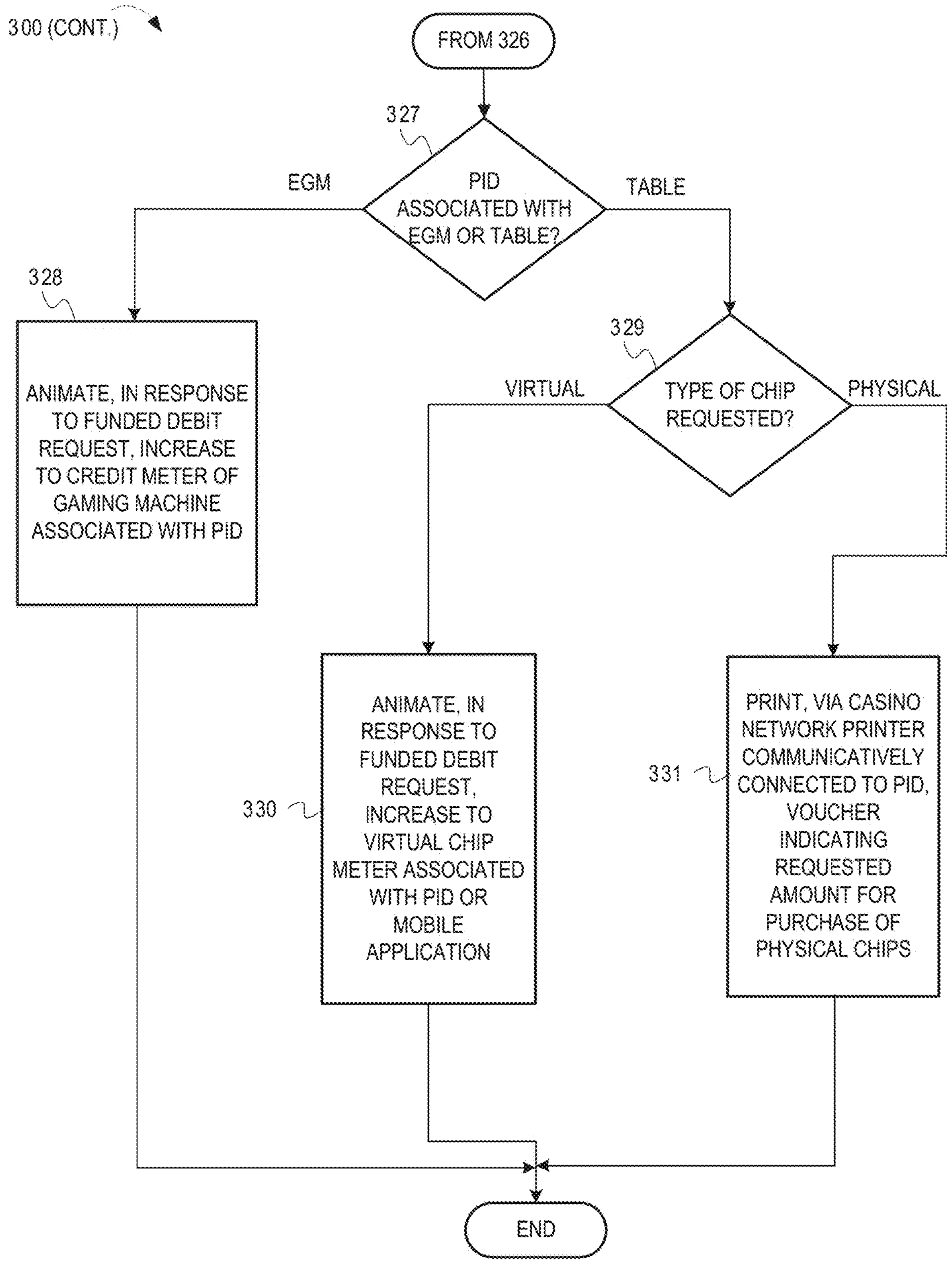

Referring again to FIG. 3, the flow 300 continues, as shown in FIG. 21, at processing block 327, where a processor determines whether the player interface device is associated with either an electronic gaming machine (EGM) or a gaming table (TABLE).

Referring now to FIG. 21, if, at processing block 327, the processor determines that the player interface device is associated with the EGM, the flow 300 continues at processing block 328, where a processor animates, in response to the funded debit request, an increase to a credit meter of the gaming machine associated with the player interface device. For example, as shown FIG. 11B, the game controller 108 increases the value of the credit meter 680 with an amount of credits that correspond (e.g., are equivalent or proportional in value to the requested debit amount). The level of increase to the credit meter 680 depends on the bet denomination value selected for the gaming machine 110 (e.g., for a bet denomination value of $0.05 per credit, a $25 debit transfer results in an increase of five hundred credits).

Figure 13A:
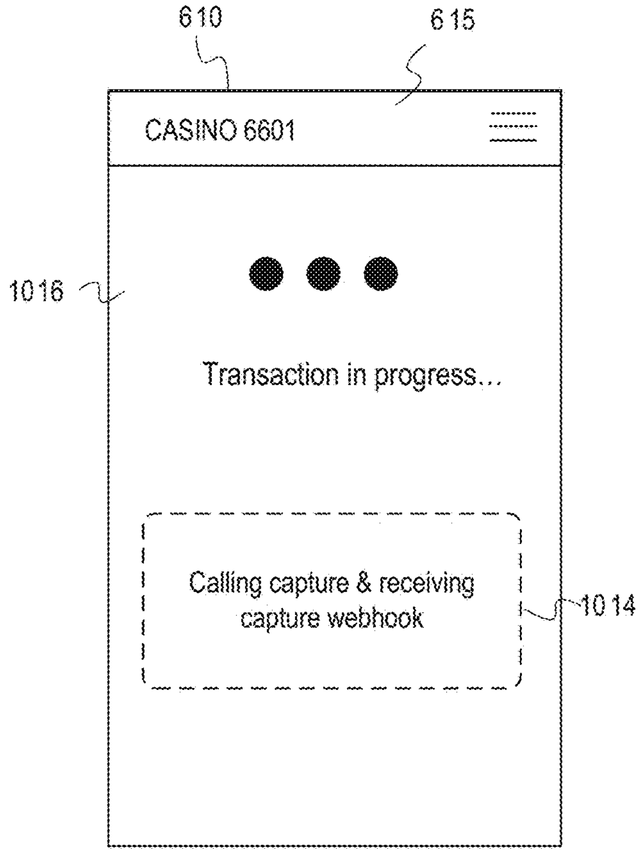
Figure 13B:
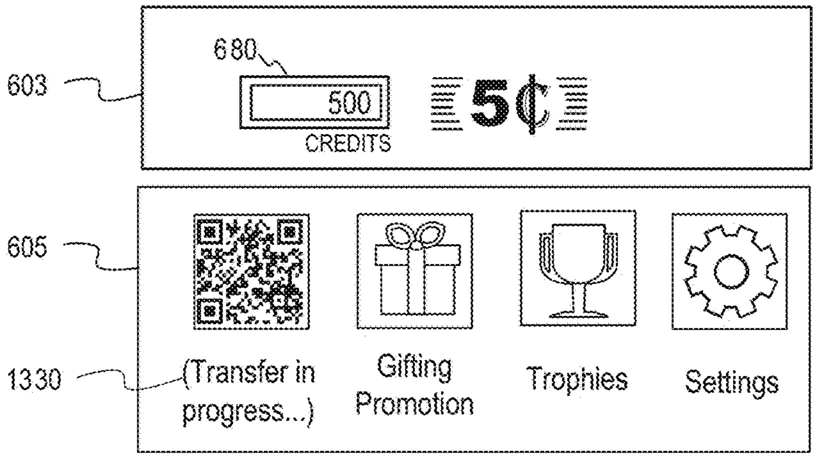
Figure 14A:
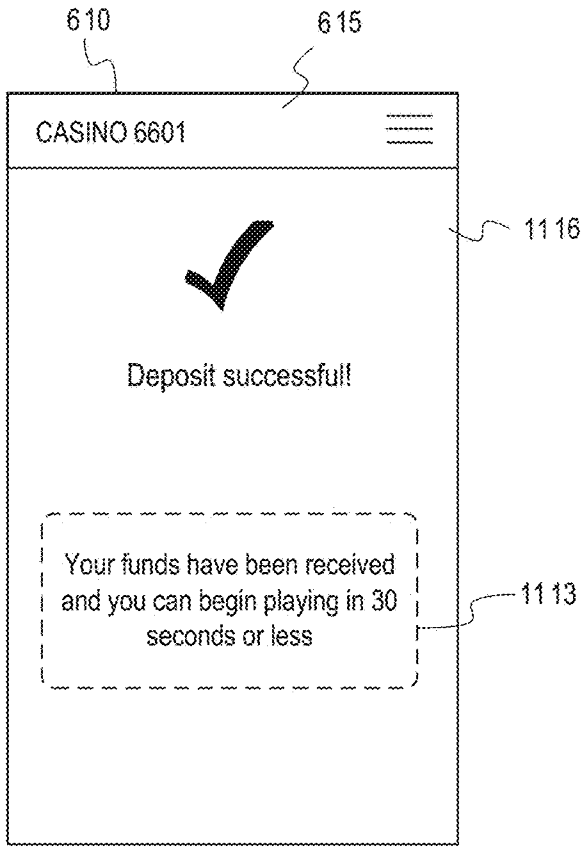
Figure 14B:
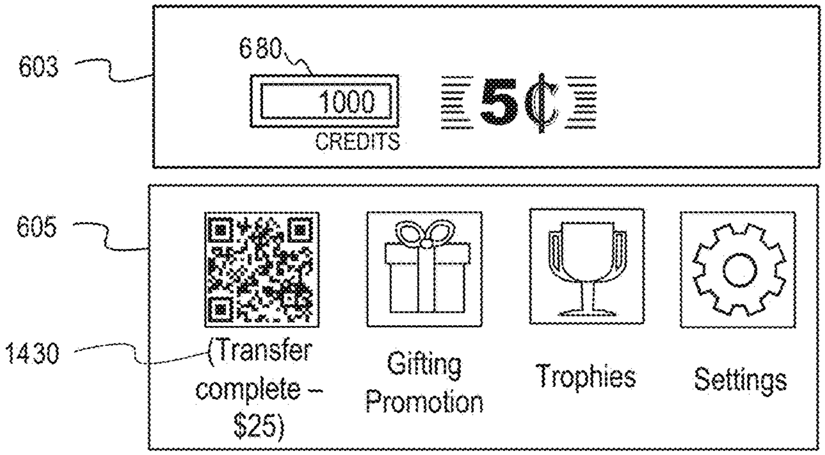

In one embodiment, during performance of a subsequent (second) instance of flow 300, the processor can, at processing block 306, determine use of the stored PIN (as described for FIGS. 12A, 12B, and 12C) and perform processing block 310. Upon performing processing block 310, as shown in FIG. 13A, the browser 610 presents (via merchant-client UI 615) screen 1016 which indicates message 1014. As shown in FIG. 13B, the system-based content presents message 1330 indicating the transfer is in progress. The browser 610 bypasses the need to present the message 1013 (shown in FIG. 10A) because authentication of the online banking payment instrument (the previously selected bank account) already occurred via processing block 316 during occurrence of the previously performed (first) instance of the flow 300. During the second instance of the flow 300, if funds are deposited to the gaming machine, the microsite presents (as shown in FIG. 14A) the screen 1116 again. Furthermore, upon completion of the second instance of the flow 300, as shown in FIG. 14B, the player interface device 106 presents (via the system-based content 605) a message 1430 indicating completion of the transfer and the credit meter 1080 is funded (e.g., via AFT) with a corresponding increase.

Referring back to FIG. 21, if, at processing block 327, the processor determines that the player interface device is associated with a gaming table, the flow 300 continues at processing block 329, where a processor determines whether the transferred funds in the wallet account should be applied to purchase of either virtual chips (if the gaming table and/or player interfaced device 2201 is configured for use of virtual chips) or whether the player is requesting physical chips. If, at processing block 329 the processor determines that the request is for virtual chips, then at processing block 330, a processor animates, in response to the funded debit request, and increase to a virtual chip meter associated with either the player interface device (e.g., player interface device 2210), the mobile application, or another player-accessible device or interface. However, if at processing block 329 the processor determines that the request is for physical chips, the flow 300 continues at processing block 331, where a processor prints, via a printer associated with the gaming table, a voucher indicating the requested amount for the purchase of the physical chips. For example, in FIG. 25, the player interface device 2210 displays message 2209 indicating that the open banking transaction was successful. The player interface device 2210 can play a specific tone that the transaction was successful. Furthermore, the browser 2410 presented, via microsite 2415, message 2504 indicates that the amount has been transferred and a voucher is being printed. Printer 2390 (e.g., attached to gaming table 280) prints a voucher 2520 indicating the transaction amount. The dealer then distributes (e.g., via chip tray 2385) the corresponding amount of chips to the player and places the receipt in a drop box (obtaining any approvals from other casino supervisory personnel according to procedures).

Figure 19:
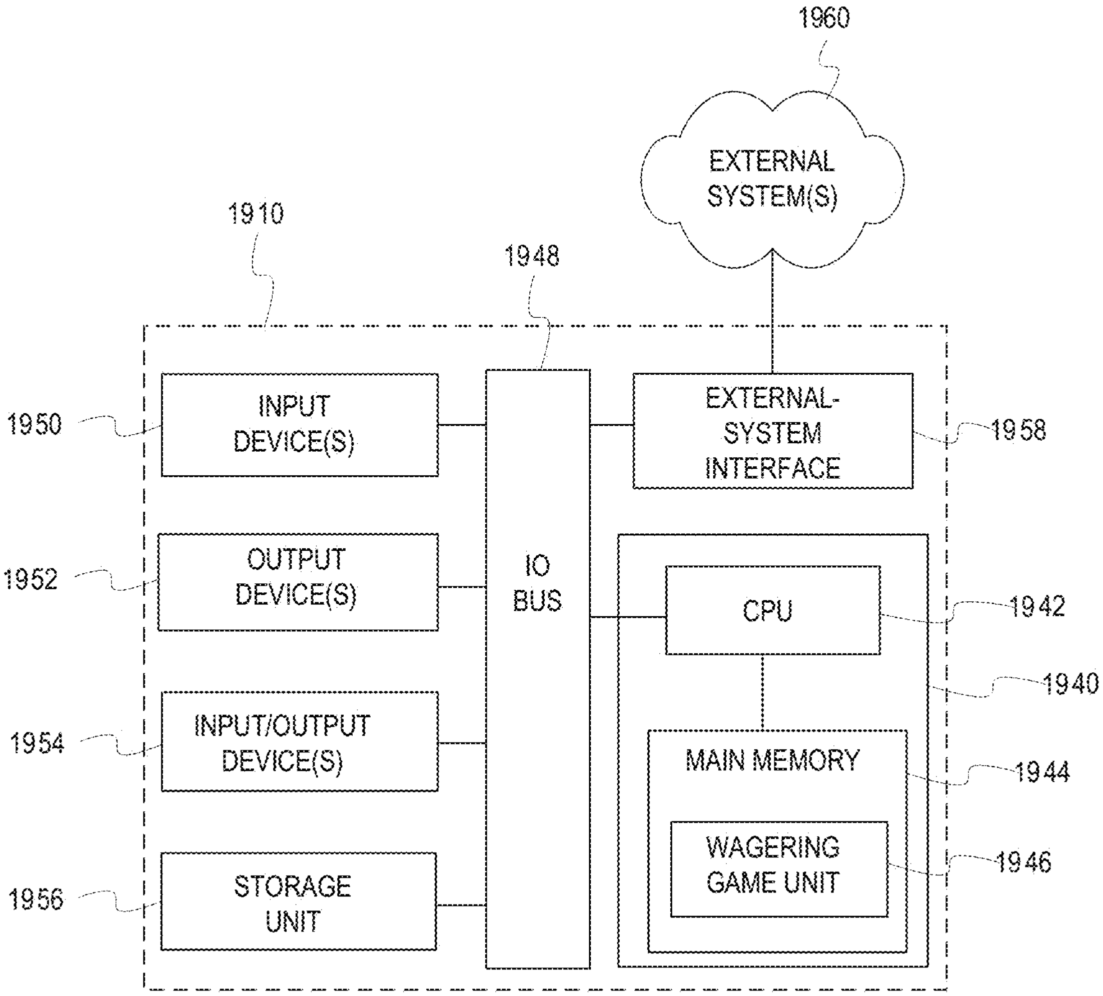
FIG. 19 is a schematic view of a gaming system according to one or more embodiments of the present disclosure.

FIG. 19 is schematic view of a gaming system according to at least some aspects of the disclosed concepts. Referring to FIG. 19, a gaming machine 1910 includes game-logic circuitry 1940 (e.g., securely housed within a locked box inside a gaming cabinet). The game-logic circuitry 1940 includes a central processing unit (CPU) 1942 connected to a main memory 1944 that comprises one or more memory devices. The CPU 1942 includes any suitable processor(s), such as those made by Intel and AMD. By way of example, the CPU 1942 includes a plurality of microprocessors including a master processor, a slave processor, and a secondary or parallel processor. Game-logic circuitry 1940, as used herein, comprises any combination of hardware, software, or firmware disposed in or outside of the gaming machine 1910 that is configured to communicate with or control the transfer of data between the gaming machine 1910 and a bus, another computer, processor, device, service, or network. The game-logic circuitry 1940, and more specifically the CPU 1942, comprises one or more controllers or processors and such one or more controllers or processors need not be disposed proximal to one another and may be located in different devices or in different locations. The game-logic circuitry 1940, and more specifically a main memory 1944, comprises one or more memory devices which need not be disposed proximal to one another and may be located in different devices or in different locations. The game-logic circuitry 1940 is operable to execute all of the various gaming methods and other processes disclosed herein. The main memory 1944 includes a wagering game unit 1946. In one embodiment, the wagering-game unit 1946 causes wagering games to be presented, such as video poker, video black jack, video slots, video lottery, etc., in whole or part.

The game-logic circuitry 1940 is also connected to an input/output (I/O) bus 1948, which can include any suitable bus technologies, such as an AGTL+ frontside bus and a PCI backside bus. The I/O bus 1948 is connected to various input devices 1950, output devices 1952, and input/output devices 1954.

By way of example, the output devices may include a primary display, a secondary display, and one or more audio speakers. The primary display or the secondary display may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 1910. The gaming machine 1910 can also include a touch screen(s) mounted over the primary or secondary displays, buttons on a button panel, a bill/ticket acceptor, a card reader/writer, a ticket dispenser, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, buttons, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The input/output devices 1954 include one or more value input/payment devices and value output/payout devices. In order to deposit cash or credits onto the gaming machine 1910, the value input devices are configured to detect a physical item associated with a monetary value that establishes a credit balance on a credit meter. The physical item may, for example, be currency bills, coins, tickets, vouchers, coupons, cards, and/or computer-readable storage mediums. The deposited cash or credits are used to fund wagers placed on the wagering game played via the gaming machine 1910. Examples of value input devices include, but are not limited to, a coin acceptor, a bill/ticket acceptor (e.g., a bill validator), a card reader/writer, a wireless communication interface (e.g., communication device 103) for reading cash or credit data from a nearby mobile device, and a network interface for withdrawing cash or credits from a remote account via an electronic funds transfer. In response to a cashout input that initiates a payout from the credit balance on the "credits" meter, the value output devices are used to dispense cash or credits from the gaming machine 1910. The credits may be exchanged for cash at, for example, a cashier or redemption station. Examples of value output devices include, but are not limited to, a coin hopper for dispensing coins or physical gaming tokens (e.g., chips), a bill dispenser, a card reader/writer, a ticket dispenser for printing tickets redeemable for cash or credits, a wireless communication interface for transmitting cash or credit data to a nearby mobile device, and a network interface for depositing cash or credits to a remote account via an electronic funds transfer.

The I/O bus 1948 is also connected to a storage unit 1956 and an external-system interface 1958, which is connected to external system(s) 1960 (e.g., wagering-game networks, communications networks, etc.).

The external system(s) 1960 includes, in various aspects, a gaming network, other gaming machines or terminals, a gaming server, a remote controller, communications hardware, or a variety of other interfaced systems or components, in any combination. In yet other aspects, the external system(s) 1960 comprises a player's portable electronic device (e.g., cellular phone, electronic wallet, etc.) and the external-system interface 1958 is configured to facilitate wireless communication and data transfer between the portable electronic device and the gaming machine 1910, such as by a near-field communication path operating via magnetic-field induction or a frequency-hopping spread spectrum RF signals (e.g., Bluetooth, etc.).

The gaming machine 1910 optionally communicates with the external system(s) 1960 such that the gaming machine 1910 operates as a thin, thick, or intermediate client. The game-logic circuitry 194—whether located within ("thick client"), external to ("thin client"), or distributed both within and external to ("intermediate client") the gaming machine 1910—is utilized to provide a wagering game on the gaming machine 1910. In general, the main memory 1944 stores programming for a random number generator (RNG), game-outcome logic, and game assets (e.g., art, sound, etc.)—all of which obtained regulatory approval from a gaming control board or commission and are verified by a trusted authentication program in the main memory 1944 prior to game execution. The authentication program generates a live authentication code (e.g., digital signature or hash) from the memory contents and compares it to a trusted code stored in the main memory 1944. If the codes match, authentication is deemed a success and the game is permitted to execute. If, however, the codes do not match, authentication is deemed a failure that must be corrected prior to game execution. Without this predictable and repeatable authentication, the gaming machine 1910, external system(s) 1960, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 1942 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 1942 when executing the game-outcome logic to determine a resultant outcome for that instance of the wagering game. The resultant outcome is then presented to a player of the gaming machine 1910 by accessing the associated game assets, required for the resultant outcome, from the main memory 1944. The CPU 1942 causes the game assets to be presented to the player as outputs from the gaming machine 1910 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 1910 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 1910 may include additional peripheral devices or more than one of each component shown in FIG. 19. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 20:
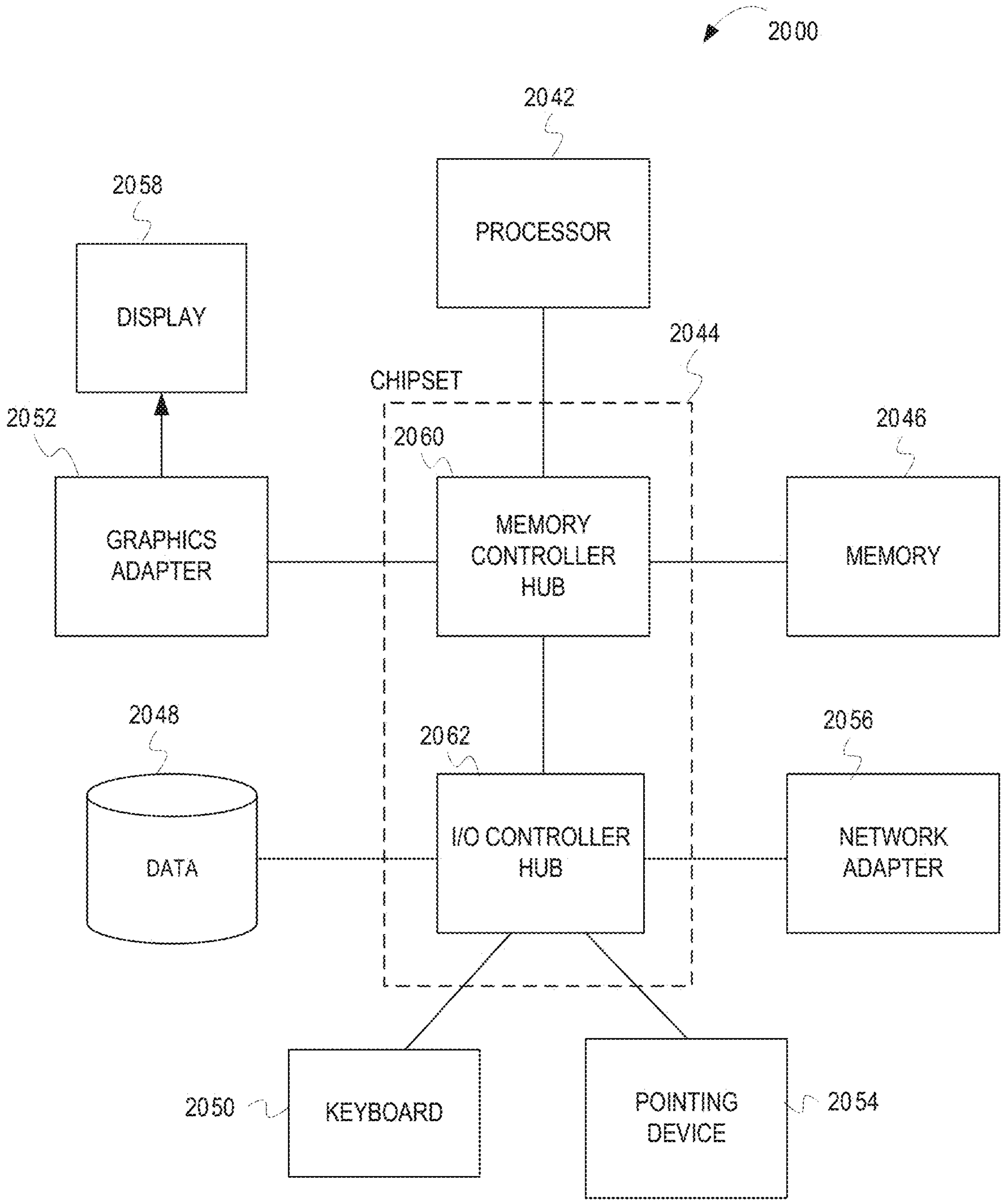
FIG. 20 is a diagram of a computer system according to one or more embodiments of the present disclosure.

FIG. 20 is shown a block diagram of a computer system 2000 according to one or more embodiments. The computer system 2000 includes at least one processor 2042 coupled to a chipset 2044, as indicated in dashed lines. Also coupled to the chipset 2044 are memory 2046, a storage device 2048, a keyboard 2050, a graphics adapter 2052, a pointing device 2054, and a network adapter 2056. A display 2058 is coupled to the graphics adapter 2052. In one embodiment, the functionality of the chipset 2044 is provided by a memory controller hub 2060 and an I/O controller hub 2062. In another embodiment, the memory 2046 is coupled directly to the processor 2042 instead of to the chipset 2044.

The storage device 2048 is any non-transitory computer-readable storage medium, such as a hard drive, a compact disc read-only memory (CD-ROM), a DVD, or a solid-state memory device (e.g., a flash drive). The memory 2046 holds instructions and data used by the processor 2042. The pointing device 2054 may be a mouse, a track pad, a track ball, or another type of pointing device, and it is used in combination with the keyboard 2050 to input data into the computer system 2000. The graphics adapter 2052 displays images and other information on the display 2058. The network adapter 2056 couples the computer system 2000 to a local or wide area network.

As is known in the art, the computer system 2000 can have different and/or other components than those shown in FIG. 20. In addition, the computer system 2000 can lack certain illustrated components. In one embodiment, the computer system 2000 acting as the gateway 120 (FIG. 1) may lack the keyboard 2050, pointing device 2054, graphics adapter 2052, and/or display 2058. Moreover, the storage device 2048 can be local and/or remote from the computer system 2000 (such as embodied within a storage area network (SAN)). Moreover, other input devices, such as, for example, touch screens may be included.

The network adapter 2056 (may also be referred to herein as a communication device) may include one or more devices for communicating using one or more of the communication media and protocols discussed above with respect to FIGS. 1, 2, 3, 4, 5, 6, 7A, 7B, 8A, 8B, 8C, 9A, 9B, 10A, 10B, 10C, 11A, 11B, 12A, 12B, 12C, 13A, 13B, 14A, 14B, 15A, 15B, 16A, 16B, 17, 18 and/or 19.

In addition, some or all of the components of this general computer system 2000 of FIG. 20 may be used as part of the processor and memory discussed above with respect to the systems or devices described for FIGS. 1, 2, 3, 4, 5, 6, 7A, 7B, 8A, 8B, 8C, 9A, 9B, 10A, 10B, 10C, 11A, 11B, 12A, 12B, 12C, 13A, 13B, 14A, 14B, 15A, 15B, 16A, 16B, 17, 18 and/or 19.

In some embodiments, a gaming system may comprise several such computer systems 2000. The gaming system may include load balancers, firewalls, and various other components for assisting the gaming system to provide services to a variety of user devices.

The computer system 2000 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 2048, loaded into the memory 2046, and executed by the processor 2042.

FIGS. 3, 4, and 5, described by way of examples above, represent data processing methods (e.g., algorithms) that correspond to at least some instructions stored and executed by a processor and/or logic circuitry associated with the gateway 120 and/or with the player interface device 106. However other embodiments can utilize processors and/or logic circuitry of any of the devices described for FIGS. 1, 2, 6, 7A, 7B, 8A, 8B, 8C, 9A, 9B, 10A, 10B, 10C, 11A, 11B, 12A, 12B, 12C, 13A, 13B, 14A, 14B, 15A, 15B, 16A, 16B, 17, 18 and/or 19 to perform the above described functions associated with the disclosed concepts.

Any component of any embodiment described herein may include hardware, software, or any combination thereof.

Further, the operations described herein can be performed in any sensible order. Any operations not required for proper operation can be optional. For example, processing block 327 may be optional if an embodiment is configured for only an EGM or only for a gaming table, thus the player interface device would already be associated with one or the other device. If configured for only an EGM, then flow 300 can continue from processing block 326 to processing block 328. If configured for only a gaming table, then the flow can continue from processing block 326 to processing block 329. Furthermore, if the gaming table is configured for use of only virtual chips or only physical chips, then processing block 329 can be optional. If the gaming table is configured for only virtual chips, then flow 300 can continue from processing block 326 to processing block 330. On the hand, if the gaming table is configured for only physical chips, then flow 300 can continue from processing block 326 to processing block 331. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A method comprising:

connecting, by a processor in response to QR code capture, a user computing device to a microsite accessible to a casino merchant system and a payment service provider (PSP) system;

performing, by the processor, an open banking verification to access an online banking payment instrument associated with a user of the user computing device;

submitting, by the processor, a debit request for a requested amount from the online banking payment instrument, wherein the PSP system provides, in response to submission of the debit request, an anonymous token associated with a selection of the online banking payment instrument;

funding, by the processor using the anonymous token as a reference, the debit request to an anonymous digital wallet account of the casino merchant system; and performing, via communication between the casino merchant system and a player interface device using the anonymous token as a reference to the anonymous digital wallet account, an authorized gaming funds transfer that one or more of (a) adds a corresponding amount of credits to a credit meter of a gaming machine communicatively coupled to the player interface device or (b) prints, from a printer communicatively coupled to the player interface device, a voucher which can be exchanged for a corresponding amount of gaming chips at a gaming table, or (c) adds a corresponding amount of virtual casino chips associated with the requested amount to a meter associated with the player interface device.

2. The method of claim 1, wherein the online banking payment instrument comprises one or more of a personal checking account, a personal savings account, or a Real-Time-Payments (RTP) account.

3. The method of claim 1 further comprising determining, by the processor based on the anonymous token, whether a debit limit would be exceeded if the requested amount were to be debited by the debit request, and wherein one or more of funding the debit request or performing the authorized gaming funds transfer is in response to determining that the debit limit would not be exceeded.

4. The method of claim 3, wherein determining that the debit limit would not be exceeded comprises:

determining, by the processor, a time range associated with the debit limit;

searching, by the processor, a database of the casino merchant system for a set of records that include the anonymous token and which occurred, based on time stamps of the set of records, within the time range;

aggregating, by the processor, a sum of the requested amount and one or more previously debited amounts indicated within the set of records;

comparing, by the processor, the sum to a limit value specified by the debit limit; and determining, by the processor in response to the comparing, that the sum does not exceed the limit value.

5. The method of claim 1, wherein funding the debit request to the anonymous digital wallet account comprises:

establishing, by the processor, a webhook between the PSP system and the casino merchant system; and submitting, by the processor from the casino merchant system to the PSP system via the webhook, a capture transaction call using the anonymous token, wherein the capture transaction call authorizes payment of the requested amount from the online banking payment instrument to the casino merchant system via a transaction made via an ACH network, FedNow, or other similar fund transfer service.

6. The method of claim 1, wherein the authorized gaming funds transfer is performed via one or more of an Advanced Funds Transfer (AFT) protocol or an Electronic Funds Transfer (EFT) protocol associated with the casino merchant system.

7. The method of claim 1, wherein the PSP system is a licensed payment provider that may be regulated within a jurisdiction in which the casino is physically located.

8. The method of claim 1, wherein the PSP system offers a bank-independent payment service that facilitates, using an open banking or bank-as-a-service (BaaS) platform, authorized and secure financial transactions from a bank account managed by a regulated bank system, wherein the bank account is a personal banking account of a user of the user computing device.

9. The method of claim 1, further comprising:

prior to performing the verification presenting, by the processor in response to one or more API calls to the PSP system, a user interface (UI) module that overlays a portion of content presented via a user interface of a merchant client associated with the casino merchant system, wherein the UI module permits selection of a bank associated with the online banking payment instrument; and authenticating, via the open banking verification between the merchant client and a PSP client associated with the PSP system, access to one or more bank accounts associated with a user of the user computing device.

10. The method of claim 1 further comprising:

generating, via an API call to the casino merchant system by the player interface device, the QR code via a QR code generator that periodically refreshes a QR code identifier, wherein the generator encodes QR code data that comprises the QR code identifier, location information associated with the player interface device, and device information associated with one or more of the player interface device or the mobile device; and presenting the QR code via the player interface device to be scanned via an image sensor of the user computing device.

11. The method of claim 10, wherein the QR code further includes additional QR code data associated with at least one of gaming table asset information, a gaming table identifier, or a player gaming position identifier associated with a gaming table at which the QR code is presented.

12. The method of claim 11, wherein the player interface device is attached to the player gaming position at the gaming table, and wherein the player interface device is configured to communicate via a near-field communication device incorporated into the player interface device.

13. The method of claim 1, wherein communications between the casino merchant system and the PSP system use a split token, and wherein the PSP system persists a portion of the split token, and said method further comprising providing, to a merchant client running via the microsite, an encoded portion of the split token via a JavaScript Object Notation (JSON) web token, wherein the JSON web token uses the anonymous token as a reference.

14. The method of claim 1, wherein the PSP system is configured to access a database that stores information about one or more online banking payment instruments associated with one or more bank access credentials requested via the microsite for one or more banks available via the PSP system, and wherein the PSP system is configured to obtain, via access to the database, a unique token value to be provided, as the anonymous token, to the casino merchant system, wherein the unique token value is a static reference value that represents use of any of the one or more online banking payment instruments via the microsite by a same user.

15. A gaming system comprising:

a player interface device configured to present a QR code, wherein the player interface device is communicatively coupled to one or more of a gaming machine or a gaming table; and a processor communicatively coupled to a telecommunication network and a gaming network, wherein the processor is configured to execute instructions that, when executed, cause the gaming system to perform operations to:

in response to capture of the QR code by an image sensor of a mobile user computing device, connect the mobile user computing device to a microsite accessible to a casino merchant system and a payment service provider (PSP) system;

perform an open banking verification to access an online banking payment instrument associated with a user of the mobile user computing device;

submit a debit request for a requested amount from the online banking payment instrument, wherein the PSP system provides, in response to submission of the debit request, an anonymous token associated with a selection of the online banking payment instrument;

upon authorization, fund, using the anonymous token as a reference, the debit request to an anonymous digital wallet account of the casino merchant system; and perform, via communication between the casino merchant system and the player interface device using the anonymous token as a reference to the anonymous digital wallet account, an authorized gaming funds transfer that initiates at least one of one or more operations to (a) add a corresponding amount of credits to a credit meter of the gaming machine, (b) print, from a printer communicatively coupled to the player interface device, a voucher indicating the requested amount for exchange of gaming chips at the gaming table, or (c) add a corresponding amount of virtual casino chips associated with the requested amount to a meter associated with the player interface device.

16. The gaming system of claim 15, wherein the online banking payment instrument comprises one or more of a personal checking account, a personal savings account, or a Real-Time-Payments (RTP) account.

17. The gaming system of claim 15, wherein the processor is configured to execute instructions that, when executed, cause the gaming system to perform operations that further cause the gaming system to determine, based on the anonymous token, whether a debit limit would be exceeded if the requested amount were to be debited by the debit request, and wherein one or more of the operation to fund the debit request or the operation to perform the authorized gaming funds transfer is in response to determination that the debit limit would not be exceeded.

18. The gaming system of claim 17, wherein instructions that cause the gaming system to perform the operation to determine that the debit limit would not be exceeded includes instructions, which when executed by the processor, cause the gaming system to perform operations to:

determine a time range associated with the debit limit;

search a database of the casino merchant system for a set of records that include the anonymous token and which occurred, based on time stamps of the set of records, within the time range;

aggregate a sum of the requested amount and one or more previously debited amounts indicated within the set of records;

compare the sum to a limit value specified by the debit limit; and determine, in response to comparison of the sum to the limit value, that the sum does not exceed the limit value.

19. The gaming system of claim 15, wherein the processor is configured to execute additional instructions that, when executed, cause the gaming system to perform further operations to cause the player interface device to present a first of a plurality of tones in response to the successful completion of at least one of the open banking verification, the submitted debit request, the funded debit request to the anonymous digital wallet account, or performance of the authorized gaming funds transfer, wherein the player interface device is further configured to present a second of the plurality of tones in response to an unsuccessful completion of at least one of the open banking verification, the submitted debit request, the funded debit request to the anonymous digital wallet account, or performance of the authorized gaming funds transfer.

20. The gaming system of claim 15, wherein the player interface device is configured to change color according to a status associated with at least one of the open banking verification, the submitted debit request, the funded debit request to the anonymous digital wallet account, or performance of the authorized gaming funds transfer.

21. A non-transitory computer-readable storage medium storing instructions that, when executed by a processor, cause the processor to perform operations comprising:

connecting, in response to QR code capture, a user computing device to a microsite accessible to a casino merchant system and a payment service provider (PSP) system;

performing an open banking verification to access an online banking payment instrument associated with a user of the user computing device;

submitting a debit request for a requested amount from the online banking payment instrument, wherein the PSP system provides, in response to submission of the debit request, an anonymous token associated with a selection of the online banking payment instrument;

funding, using the anonymous token as a reference, the debit request to an anonymous digital wallet account of the casino merchant system; and performing, via communication between the casino merchant system and a player interface device using the anonymous token as a reference to the anonymous digital wallet account, an authorized gaming funds transfer that one or more of (a) adds a corresponding amount of credits to a credit meter of a gaming machine communicatively coupled to the player interface device or (b) prints, from a printer communicatively coupled to the player interface device, a voucher which can be exchanged for a corresponding amount of gaming chips at a gaming table, or (c) adds a corresponding amount of virtual casino chips associated with the requested amount to a meter associated with the player interface device.

* * * * *